(12) United States Patent
Day et al.

(10) Patent No.: US 12,187,161 B2
(45) Date of Patent: *Jan. 7, 2025

(54) VEHICLE POWER DISTRIBUTION ARCHITECTURE

(71) Applicant: TUSIMPLE, INC., San Diego, CA (US)

(72) Inventors: Jade E. Day, Tucson, AZ (US); Jeffrey Renn, Tucson, AZ (US)

(73) Assignee: TUSIMPLE, INC., San Diego, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 17/725,375

(22) Filed: Apr. 20, 2022

(65) Prior Publication Data

US 2022/0242276 A1    Aug. 4, 2022

Related U.S. Application Data

(63) Continuation of application No. 16/917,549, filed on Jun. 30, 2020, now Pat. No. 11,332,039.

(60) Provisional application No. 62/873,795, filed on Jul. 12, 2019.

(51) Int. Cl.
| | |
|---|---|
| *H02J 7/00* | (2006.01) |
| *B60L 58/20* | (2019.01) |
| *B60L 58/25* | (2019.01) |

(52) U.S. Cl.
CPC .............. *B60L 58/25* (2019.02); *B60L 58/20* (2019.02)

(58) Field of Classification Search
None
See application file for complete search history.

(56) References Cited

U.S. PATENT DOCUMENTS

| | | |
|---|---|---|
| 10,554,057 B1 | 2/2020 | Wang |
| 2003/0117113 A1 | 6/2003 | Takemasa |
| 2004/0130214 A1 | 7/2004 | Murty et al. |
| 2004/0163858 A1 | 8/2004 | Borrego |
| 2008/0143292 A1 | 6/2008 | Ward |
| 2009/0001926 A1 | 1/2009 | Sato |
| 2010/0133029 A1 | 6/2010 | Moran |

(Continued)

FOREIGN PATENT DOCUMENTS

DE    102017222557 A1    6/2019

OTHER PUBLICATIONS

European Patent Office, Examination Report for EP 20185461.9, Mailing Date: Nov. 11, 2022, 7 pages.

(Continued)

*Primary Examiner* — Arun C Williams
(74) *Attorney, Agent, or Firm* — Perkins Coie LLP

(57) ABSTRACT

Power distribution system architectures are described that can safely and effectively support the power needs of automotive original equipment manufacturer (OEM) systems and state-of-the-art autonomous systems and devices. In some implementations, a power distribution system may include: vehicle power sources that produce an output voltage to operate one or more devices in the vehicle, and power bridge devices that electrically couple an vehicle power source to the multiple banks of battery bridge devices and to power distribution units (PDUs). Various electrical loads in the vehicle can be electrically coupled to the battery bridge devices and to the PDUs.

20 Claims, 11 Drawing Sheets

(56) References Cited

U.S. PATENT DOCUMENTS

| | | |
|---|---|---|
| 2012/0041630 A1 | 2/2012 | Yamamoto |
| 2012/0049771 A1 | 3/2012 | Komatsu |
| 2012/0053742 A1 | 3/2012 | Tsuda |
| 2013/0113413 A1 | 5/2013 | Harty |
| 2013/0119932 A1* | 5/2013 | Moon .................... B60L 58/20 |
| | | 320/109 |
| 2013/0187590 A1 | 7/2013 | Ferrel |
| 2013/0241496 A1* | 9/2013 | Kurayama .......... H02J 7/00306 |
| | | 320/128 |
| 2013/0342167 A1* | 12/2013 | Bissontz ................ B60L 58/22 |
| | | 320/118 |
| 2014/0340095 A1 | 11/2014 | Schneider |
| 2014/0354212 A1 | 12/2014 | Sugeno |
| 2016/0001665 A1 | 1/2016 | Kim |
| 2016/0001719 A1 | 1/2016 | Frost |
| 2016/0137078 A1 | 5/2016 | Yun |
| 2016/0204707 A1 | 7/2016 | Takahara |
| 2018/0236899 A1 | 8/2018 | Takeoka |
| 2018/0301912 A1 | 10/2018 | Shen |

OTHER PUBLICATIONS

Extended European Search Report for European Patent Application No. 20185461.9, mailed Oct. 7, 2020.

* cited by examiner

VEHICLE POWER DISTRIBUTION ARCHITECTURE

CROSS REFERENCE TO RELATED APPLICATIONS

The present application is a continuation of and claims the benefit of priority to U.S. patent application Ser. No. 16/917,549, filed on Jun. 30, 2020, which claims the benefit of U.S. Provisional Patent Application No. 62/873,795, filed Jul. 12, 2019, the disclosures of which are incorporated by reference herein each in its entirety.

TECHNICAL FIELD

This document relates to power distribution architecture in a vehicle.

BACKGROUND

A vehicle may include several devices that need power for various applications. For example, a vehicle engine controller or engine control unit needs power to measure sensor data onboard the vehicle to control the engine's ignition timing and/or air to fuel ratio. More recently, vehicles may include cameras and sensors may be attached to the vehicle for security purposes, for driving aid, or for facilitating autonomous driving. Cameras mounted on a vehicle can obtain images of one or more areas surrounding the vehicle, and sensors mounted on a vehicle can obtain sensor data of various aspects of the environment that surrounds the vehicle. The cameras images and sensor data can be processed and used to safely maneuver an autonomous vehicle through traffic or on a highway. To obtain and process camera images and sensor data, cameras, sensors, and other devices in a vehicle need a power source.

SUMMARY

This patent document discloses power distribution architectures that can safely and effectively support the power needs of automotive original equipment manufacturer (OEM) systems and state-of-the-art autonomous systems and devices.

An example embodiment discloses a power distribution system, comprising: a first power device and a second power device located on or in a vehicle, where either the first power device or the second power device is configured to provide electrical power at a first voltage to a first power distribution device (PDD) in the vehicle, where the first PDD is configured to provide electrical power to a first set of devices that operate at the first voltage in the vehicle; and two or more banks of battery bridge devices (BBDs) configured to receive electrical power from either the first power device or the second power device, where the two or more banks of BBDs are configured to provide electrical power at the first voltage to the first set of devices via the first PDD, where one or more banks of BBDs are configured to provide electrical power at a second voltage to a second set of devices in the vehicle, and where one bank of BBDs is electrically coupled in series to another bank of BBDs.

In some embodiments, each BBD comprises a battery and a cell balancer configured to discharge the battery upon determining that the battery is in an over-charged condition. In some embodiments, each BBD further comprises: an electrical switch electrically coupled to an anode of the battery, a microcontroller, a current sensor that measures an amount of current drawn from the battery, and a temperature sensor that measures a temperature of the battery, where the microcontroller is communicably coupled to the electrical switch, the temperature sensor, and the current sensor, and where the microcontroller is configured to instruct the electrical switch to open in response to determining that a measured amount of current drawn from the battery is greater than a first threshold value or that a measured temperature is greater than a second threshold value. In some embodiments, in each BBD, the cell balancer includes a direct current-direct current (DC-DC) converter that is electrically coupled to a comparator, where, in each BBD, the microcontroller is communicably coupled to one or more inputs of the comparator and a second input of the comparator is electrically coupled to an anode of the battery, where the microcontroller is configured to send to the one or more inputs of the comparator one or more reference voltages, where the comparator is configured to generate an output voltage upon determining that a voltage across the battery is greater than a highest value of the one or more reference voltages, and where the DC-DC converter is configured to turn on the DC-DC converter to discharge the battery upon sensing the output voltage.

In some embodiments, the power distribution system further includes a second PDD electrically coupled to an electrical bus in between two adjacent banks of BBDs, wherein the one or more banks of BBDs are configured to provide electrical power at the second voltage to the second set of devices in the vehicle via the second PDD. In some embodiments, each of the first PDD and the second PDD comprises: a first relay; a temperature sensor communicably coupled to a microcontroller, where the microcontroller is configured to instruct the first relay to open to disconnect a PDD from the first power device, the second power device, and the two or more banks of BBDs upon determining that a temperature value measured by the temperature sensor exceeds a threshold value. In some embodiments, each of the first PDD and the second PDD comprises: a first voltage sensor and a first current sensor electrically coupled to a terminal in a PDD and communicably coupled to the microcontroller, and where the microcontroller is configured to instruct the first relay to open to disconnect the PDD from either the first power device and the second power device or the two or more bank of BBDs upon determining that a voltage measured by the first voltage sensor exceeds a first threshold value or that a current measured by the first current sensor exceeds a second threshold value.

In some embodiments, each of the first PDD and the second PDD comprises a first set of channels and a second set of channels, where each channel of the first set of channels comprises: a first electromagnetic interference (EMI) filter electrically coupled to at least some of either the first set of devices or the second set of devices; and where each of the second set of channels comprises: a second EMI filter, a second relay electrically coupled to the second EMI filter and to at least some of either the first set of devices or the second set of devices, and the microcontroller communicably coupled to the second relay, wherein the microcontroller is configured to instruct the second relay to switch on to power at least some of either the first set of devices or the second set of devices. In some embodiments, each of the first set of channels and the second set of channels comprises: a second voltage sensor and a second current sensor electrically coupled to the first EMI filter or the second EMI filter and electrically coupled to the first relay or the second relay, where the second voltage sensor and the second current sensor are communicably coupled to the microcontroller, and where the microcontroller is configured to instruct the first relay or the second relay to open upon determining that a voltage measured by the second voltage sensor exceeds the first threshold value or that a current measured by the second current sensor exceeds the second threshold value.

In some embodiments, the vehicle comprises a third set of devices that are configured to operate on or in the vehicle at the second voltage, where the third set of devices are electrically coupled to the electrical bus in between two adjacent banks of BBDs, and where the third set of devices are not electrically coupled to the electrical bus via the second PDD. In some embodiments, the first power device and the second power device are respectively configured to provide electrical power via a first power bridge device and a second power bridge device to the first PDD, and where each of the first power bridge device and the second power bridge device includes: an electrical switch or a relay, a current sensor that measures an amount of current flowing through the electrical switch or the relay or a voltage sensor that measure voltage of a terminal, and a microcontroller is communicably coupled to the electrical switch or the relay and to the current sensor or the voltage sensor, where the microcontroller is configured to instruct the electrical switch or the relay to open in response to determining that the measured current is greater than a first threshold value or that the measured voltage is greater than a second threshold value. In some embodiments, the first power device includes an alternator that is configured to generate electrical power at the first voltage. In some embodiments, the second power device includes a shore power device that is configured to receive electrical power from an electrical connector when the vehicle is parked and to convert the received electrical power to the first voltage.

Another example embodiment includes a method of providing power, comprising: providing, by a power device, electrical power at a first voltage to a power distribution device (PDD) in a vehicle; providing, using the PDD, electrical power to a first set of devices that operate at the first voltage in the vehicle; and providing, by the power device, electrical power to two or more banks of battery bridge devices (BBDs), where the two or more banks of BBDs provide electrical power at the first voltage to the first set of devices via the PDD, where one or more banks of BBDs provide electrical power at a second voltage to a second set of devices in the vehicle, and where one bank of BBDs is electrically coupled in series to another bank of BBDs.

In some embodiments, each BBD comprises a battery, and where the method further comprises discharging, by each BBD, the battery upon determining that the battery is in an over-charged condition. In some embodiments, the method further comprises disconnecting, for each BBD, the battery from a source of electrical power upon determining that a measured amount of current drawn from the battery is greater than a first threshold value or that a measured temperature of a BBD is greater than a second threshold value. In some embodiments, the method further comprises sending a message to a computer located in the vehicle, where the message includes the measured amount of current or the measured temperature, and where the message includes an identifier of a BBD that sent the message. In some embodiments, for each BBD, the battery is determined to be in the over-charged condition by: generating an output voltage upon determining that a voltage across the battery is greater than a highest value of one or more reference voltages; and discharging the battery in response to the generating the output voltage. In some embodiments, the method further comprises generating, by each BBD, another voltage upon determining that the voltage across the battery is less than a lowest value of the one or more reference voltages; and charging the battery in response to the generating the another voltage. In some embodiments, the method further comprises disconnecting the PDD from the power device and the two or more banks of BBDs upon determining that a temperature value measured by a temperature sensor on or in the PDD exceeds a threshold value; or disconnecting the PDD from the power device and the two or more bank of BBDs upon determining that a voltage measured by a voltage sensor in the PDD exceeds a first threshold value or that a current measured by a current sensor in the PDD exceeds a second threshold value.

In a first exemplary embodiment, a power distribution system comprises a first power device and a second power device located on or in a vehicle and configured to provide electrical power at a first voltage in the vehicle, and a first power bridge unit and a second power bridge unit configured to electrically couple either the first power device or the second power device to a first power distribution unit (PDU). A same terminal of the first power bridge unit and the second power bridge unit are electrically coupled to a first electrical bus that is electrically coupled to an input terminal of the first PDU, and the first PDU is configured to provide electrical power to a first set of devices that operate at a first voltage in the vehicle.

The power distribution system of the first exemplary embodiment also includes two or more banks of battery bridge units (BBUs) configured to receive electrical power from either the first power device or the second power device and configured to provide electrical power at the first voltage to the first set of devices and to provide electrical power at a second voltage to a second set of devices in the vehicle. Each BBU comprises: a first terminal electrically coupled to an anode of a battery, a cell balancer unit configured to discharge the battery upon determining that the battery is in an over-charged condition, where a first end of a cell balancer is electrically coupled to the first terminal, a second terminal electrically coupled to a cathode of the battery, and a third terminal electrically coupled to a second end of the cell balancer unit.

In the power distribution system of the first exemplary embodiment, the first terminals of two or more BBUs in a first bank of BBUs are electrically coupled to the first electrical bus, the second terminals of the two or more BBUs in the first bank of BBUs are electrically coupled to a second electrical bus, the first terminals of two or more BBUs in a second bank of BBUs is electrically coupled to the second electrical bus, the second terminals of the two or more BBUs in the second bank of BBUs is electrically coupled to electrical ground, and the third terminals of the two or more BBUs in the first bank of BBUs and in the second banks of BBUs is electrically coupled to the first electrical bus. The power distribution system of the first exemplary embodiment also includes a second PDU electrically coupled to the second electrical bus, where the second PDU is configured to provide electrical power to the second set of devices that operate at the second voltage in the vehicle.

In some implementations of the first exemplary embodiment, each BBU further comprises an electrical switch located in series between the first terminal and the anode of the battery, a microcontroller unit, a current sensor that measures an amount of current drawn from the battery, and a temperature sensor thermally coupled to a housing of the battery, the temperature sensor measures a temperature of the battery, and the microcontroller unit is communicably coupled to the electrical switch, the temperature sensor, and the current sensor, where the microcontroller unit is configured to instruct the electrical switch to open in response to determining either that a measured amount of current drawn from the battery is greater than a first threshold value or that a measured temperature is greater than a second threshold value.

In some implementations of the first exemplary embodiment, the microcontroller unit is configured to send a message to a computer located in the vehicle, the message includes the measured amount of current or the measured temperature, and the message includes an identifier of a BBU whose microcontroller unit sent the message.

In some implementations of the first exemplary embodiment, in each BBU, the cell balancer unit includes a direct current-direct current (DC-DC) converter whose input terminal is electrically coupled to an output terminal of a comparator; in each BBU, a microcontroller unit is communicably coupled to one or more inputs of the comparator and a second input of the comparator is electrically coupled to the anode of the battery, the microcontroller unit sends to the one or more inputs of the comparator one or more reference voltages, the comparator generates a first output voltage at the output terminal upon determining that a voltage across the battery is greater than a highest value of the one or more reference voltages, and the DC-DC converter turns on the DC-DC converter to discharge the battery upon sensing the first output voltage at the input terminal of the DC-DC converter.

In some implementations of the first exemplary embodiment, the comparator generates a third voltage at the output terminal upon determining that the voltage across the battery is less than a lowest value of the one or more reference voltages, and the DC-DC converter turns off the DC-DC converter to charge the battery upon sensing the third voltage at the input terminal of the DC-DC converter.

In some implementations of the first exemplary embodiment, each of the first PDU and the second PDU comprises: an input terminal electrically coupled to an input of a current relay and to either the first electrical bus or the second electrical bus; a first set of channels electrically coupled to an output of the current relay, where each of the first set of channels comprises: a first fuse having an input and an output, the input of the first fuse being electrically coupled to the output of the current relay, and a first electromagnetic interference (EMI) filter having an input and an output, the input of the first EMI filter being electrically coupled to the output of the first fuse, and the output of the first EMI filter being electrically coupled to at least some of either the first set of devices or the second set of devices; a second set of channels electrically coupled to the output of the current relay, where each of the second set of channels comprises: a second fuse having an input and an output, the input of the second fuse being electrically coupled to the output of the current relay, a second EMI filter having an input and an output, the input of the second EMI filter being electrically coupled to the output of the second fuse, a relay having an input and an output, the input of the relay being electrically coupled to the output of the second EMI filter, and the output of the relay being electrically coupled to at least some of either the first set of devices or the second set of devices, and a microcontroller unit communicably coupled to the relay, where upon instruction from the microcontroller unit, the relay electrically connects the input and the output of the relay to power at least some of either the first set of devices or the second set of devices.

In some implementations of the first exemplary embodiment, each of the first PDU and the second PDU comprises: an input terminal electrically coupled to an input of a current relay and to either the first electrical bus or the second electrical bus; a temperature sensor thermally coupled to a housing of a PDU and communicably coupled to a microcontroller unit, where the microcontroller unit instructs the current relay to open to disconnect the PDU from either the first electrical bus or the second electrical bus upon determining that a temperature value measured by the temperature sensor exceeds a threshold value.

In some implementations of the first exemplary embodiment, each of the first PDU and the second PDU comprises: an input terminal electrically coupled to an input of a current relay and to either the first electrical bus or the second electrical bus; a first voltage sensor and a first current sensor electrically coupled to the input terminal and communicably coupled to a microcontroller unit, where the first voltage sensor measures voltage at the input terminal, where the first current sensor measures current at the input terminal, and where the microcontroller unit instructs the current relay to open to disconnect a PDU from either the first electrical bus or the second electrical bus upon determining either that the voltage measured by the first voltage sensor exceeds a first threshold value or that the current measured by the first current sensor exceeds a second threshold value.

In some implementations of the first exemplary embodiment, in each of the first set of channels and the second set of channels comprises: a second voltage sensor and a second current sensor electrically coupled to either the output of the EMI filter or the output of the relay, where the second voltage sensor and the second current sensor are communicably coupled to the microcontroller unit, where the second voltage sensor measures voltage at either the output of the EMI filter or the output of the relay, where the first current sensor measures current at either the output of the EMI filter or the output of the relay, and where the microcontroller unit instructs the current relay to open to disconnect a PDU from either the first electrical bus or the second electrical bus upon determining either that the voltage measured by the second voltage sensor exceeds the first threshold value or that the current measured by the second current sensor exceeds the second threshold value.

In some implementations of the first exemplary embodiment, the microcontroller unit is configured to send a message to a computer located in the vehicle, the message includes the voltage measured by the first voltage sensor or the second voltage sensor, or the message includes the current measured by the first current sensor or the second current sensor, and the message includes an identifier of the PDU whose microcontroller unit sent the message.

In some implementations of the first exemplary embodiment, each of the first power bridge unit and the second power bridge unit includes: an input terminal electrically coupled to an output terminal of either the first power device or the second power device, an output terminal electrically coupled to a first electrical bus, an electrical switch or a relay located in series between the input terminal and the output terminal of a power bridge unit, a current sensor that measures an amount of current flowing through the electrical switch or the relay or a voltage sensor that measure voltage at the input terminal, and a microcontroller unit is communicably coupled to the electrical switch and to the current sensor or the voltage sensor, where the microcontroller unit is configured to instruct the electrical switch or the relay to open in response to determining either that the measured current is greater than a first threshold value or that the measured voltage is greater than a second threshold value.

In some implementations of the first exemplary embodiment, original equipment manufacturer (OEM) devices that are configured to operate on or in the vehicle at the second voltage are electrically coupled to the second electrical bus. In some implementations of the first exemplary embodiment, the first power device includes an alternator that generates electrical power at the first voltage, and the second power device includes a shore power device that is configured to receive electrical power from an electrical connector when the vehicle is parked and to convert the received electrical power to the first voltage.

In a second exemplary embodiment, a power distribution system comprises a first power device and a second power device located on or in a vehicle and configured to provide electrical power at a first voltage in the vehicle, and a first power bridge unit and a second power bridge unit configured to electrically couple either the first power device or the second power device to a first power distribution unit (PDU). A same terminal of the first power bridge unit and the second power bridge unit are electrically coupled to a first electrical bus that is electrically coupled to an input terminal of the first PDU, and the first PDU is configured to provide electrical power to a first set of devices that operate at the first voltage in the vehicle.

The power distribution system of the second exemplary embodiment also includes two or more banks of battery bridge units (BBUs) configured to receive electrical power from either the first power device or the second power device and configured to provide electrical power at the first voltage to the first set of devices, a second voltage to a second set of devices in the vehicle, and a third voltage to a third set of devices in the vehicle. Each BBU comprises: a first terminal electrically coupled to an anode of a battery, a cell balancer unit configured to discharge the battery upon determining that the battery is in an over-charged condition, where a first end of a cell balancer is electrically coupled to the first terminal, a second terminal electrically coupled to a cathode of the battery, and a third terminal electrically coupled to a second end of the cell balancer unit.

In the power distribution system of the second exemplary embodiment, the first terminals of two or more BBUs in a first bank of BBUs is electrically coupled to the first electrical bus, the second terminals of the two or more BBUs in the first bank of BBUs are electrically coupled to a second electrical bus, the first terminals of two or more BBUs in a second bank of BBUs is electrically coupled to the second electrical bus, the second terminals of the two or more BBUs in the second bank of BBUs is electrically coupled to a third electrical bus, the first terminals of two or more BBUs in a third bank of BBUs is electrically coupled to the third electrical bus, the second terminals of the two or more BBUs in the third bank of BBUs is electrically coupled to a fourth electrical bus, the first terminals of two or more BBUs in a fourth bank of BBUs is electrically coupled to the fourth electrical bus, the second terminals of the two or more BBUs in the fourth bank of BBUs is electrically coupled to electrical ground, and the third terminals of the two or more BBUs in the first bank of BBUs, in the second banks of BBUs, in the third bank of BBUs and in the fourth bank of BBUs is electrically coupled to the first electrical bus.

The power distribution system of the second exemplary embodiment also includes a second PDU electrically coupled to the third electrical bus, where the second PDU is configured to provide electrical power to the second set of devices that operate at the second voltage in the vehicle. The power distribution system of the second exemplary embodiment also includes a third PDU electrically coupled to the fourth electrical bus, where the third PDU is configured to provide electrical power to the third set of devices that operate at the third voltage in the vehicle.

In some implementations of the second exemplary embodiment, each BBU further comprises an electrical switch located in series between the first terminal and the anode of the battery, a microcontroller unit, a current sensor that measures an amount of current drawn from the battery, and a temperature sensor thermally coupled to a housing of the battery, where the temperature sensor measures a temperature of the battery, where the microcontroller unit is communicably coupled to the electrical switch, the temperature sensor, and the current sensor, and where the microcontroller unit is configured to instruct the electrical switch to open in response to determining either that a measured amount of current drawn from the battery is greater than a first threshold value or that a measured temperature is greater than a second threshold value.

In some implementations of the second exemplary embodiment, the microcontroller unit is configured to send a message to a computer located in the vehicle, the message includes the measured amount of current or the measured temperature, and the message includes an identifier of a BBU whose microcontroller unit sent the message.

In some implementations of the second exemplary embodiment, in each BBU, the cell balancer unit includes a direct current-direct current (DC-DC) converter whose input terminal is electrically coupled to an output terminal of a comparator; in each BBU, a microcontroller unit is communicably coupled to one or more inputs of the comparator and a second input of the comparator is electrically coupled to the anode of the battery, where the microcontroller unit sends to the one or more inputs of the comparator one or more reference voltages, where the comparator generates a first output voltage at the output terminal upon determining that a voltage across the battery is greater than a highest value of the one or more reference voltages, and where the DC-DC converter turns on the DC-DC converter to discharge the battery upon sensing the first output voltage at the input terminal of the DC-DC converter.

In some implementations of the second exemplary embodiment, the comparator generates a third voltage at the output terminal upon determining that the voltage across the battery is less than a lowest value of the one or more reference voltages, and the DC-DC converter turns off the DC-DC converter to charge the battery upon sensing the third voltage at the input terminal of the DC-DC converter.

In some implementations of the second exemplary embodiment, each of the first PDU, the second PDU, and the third PDU comprises: an input terminal electrically coupled to an input of a current relay and to either the first electrical bus or the second electrical bus; a first set of channels electrically coupled to an output of the current relay, where each of the first set of channels comprises: a first fuse having an input and an output, the input of the first fuse being electrically coupled to the output of the current relay, and a first electromagnetic interference (EMI) filter having an input and an output, the input of the first EMI filter being electrically coupled to the output of the first fuse, and the output of the first EMI filter being electrically coupled to at least some of either the first set of devices or the second set of devices or the third set of devices; a second set of channels electrically coupled to the output of the current relay, where each of the second set of channels comprises: a second fuse having an input and an output, the input of the second fuse being electrically coupled to the output of the current relay, a second EMI filter having an input and an output, the input of the second EMI filter being electrically coupled to the output of the second fuse, a relay having an input and an output, the input of the relay being electrically coupled to the output of the second EMI filter, and the output of the relay being electrically coupled to at least some of either the first set of devices or the second set of devices or the third set of devices, and a microcontroller unit communicably coupled to the relay, where upon instruction from the microcontroller unit, the relay electrically connects the input and the output of the relay to power at least some of either the first set of devices or the second set of devices or the third set of devices.

In some implementations of the second exemplary embodiment, each of the first PDU, the second PDU, and the third PDU comprises: an input terminal electrically coupled to an input of a current relay and to either the first electrical bus or the second electrical bus; a temperature sensor thermally coupled to a housing of a PDU and communicably coupled to a microcontroller unit, where the microcontroller unit instructs the current relay to open to disconnect the PDU from either the first electrical bus or the second electrical bus upon determining that a temperature value measured by the temperature sensor exceeds a threshold value.

In some implementations of the second exemplary embodiment, each of the first PDU, the second PDU, and the third PDU comprises: an input terminal electrically coupled to an input of a current relay and to either the first electrical bus or the second electrical bus; a first voltage sensor and a first current sensor electrically coupled to the input terminal and communicably coupled to a microcontroller unit, where the first voltage sensor measures voltage at the input terminal, where the first current sensor measures current at the input terminal, and where the microcontroller unit instructs the current relay to open to disconnect a PDU from either the first electrical bus or the second electrical bus upon determining either that the voltage measured by the first voltage sensor exceeds a first threshold value or that the current measured by the first current sensor exceeds a second threshold value.

In some implementations of the second exemplary embodiment, in each of the first set of channels and the second set of channels comprises: a second voltage sensor and a second current sensor electrically coupled to either the output of the EMI filter or the output of the relay, where the second voltage sensor and the second current sensor are communicably coupled to the microcontroller unit, where the second voltage sensor measures voltage at either the output of the EMI filter or the output of the relay, where the first current sensor measures current at either the output of the EMI filter or the output of the relay, and where the microcontroller unit instructs the current relay to open to disconnect a PDU from either the first electrical bus or the second electrical bus upon determining either that the voltage measured by the second voltage sensor exceeds the first threshold value or that the current measured by the second current sensor exceeds the second threshold value.

In some implementations of the second exemplary embodiment, the microcontroller unit is configured to send a message to a computer located in the vehicle, the message includes the voltage measured by the first voltage sensor or the second voltage sensor, or the message includes the current measured by the first current sensor or the second current sensor, and the message includes an identifier of the PDU whose microcontroller unit sent the message.

In some implementations of the second exemplary embodiment, each of the first power bridge unit and the second power bridge unit includes: an input terminal electrically coupled to an output terminal of either the first power device or the second power device, an output terminal electrically coupled to a first electrical bus, an electrical switch or a relay located in series between the input terminal and the output terminal of a power bridge unit, a current sensor that measures an amount of current flowing through the electrical switch or the relay or a voltage sensor that measure voltage at the input terminal, and a microcontroller unit is communicably coupled to the electrical switch and to the current sensor or the voltage sensor, where the microcontroller unit is configured to instruct the electrical switch or the relay to open in response to determining either that the measured current is greater than a first threshold value or that the measured voltage is greater than a second threshold value.

In some implementations of the second exemplary embodiment, original equipment manufacturer (OEM) devices that are configured to operate on or in the vehicle at the second voltage are electrically coupled to the second electrical bus. In some implementations of the second exemplary embodiment, the first power device includes an alternator that generates electrical power at the first voltage, and the second power device includes a shore power device that is configured to receive electrical power from an electrical connector when the vehicle is parked and to convert the received electrical power to the first voltage.

In some implementations, second exemplary embodiment further comprises a second alternator electrically coupled to a third power bridge unit configured to electrically couple the second alternator to the third electrical bus and a third alternator electrically coupled to a fourth power bridge unit configured to electrically couple the third alternator to the fourth electrical bus, where an input terminal of the third power bridge unit is electrically coupled to an output terminal of the second alternator, where an input terminal of the fourth power bridge unit is electrically coupled to an output terminal of the third alternator, and where the two or more banks of BBUs are further configured to receive electrical power from either the first power device or the second power device and from the second alternator and the third alternator In yet another exemplary aspect, the above-described method is embodied in the form of processor-executable code and stored in a computer-readable program medium. Thus, a computer readable program storage medium can have code stored thereon, where the code, when executed by a processor, causes the processor to implement the method described in this patent document.

In yet another exemplary embodiment, an image processing apparatus or device that includes a processor that is configured or operable to perform the above-described methods is disclosed.

The above and other aspects and their implementations are described in greater detail in the drawings, the descriptions, and the claims.

DETAILED DESCRIPTION

The development of autonomous vehicles has led to an increased power demand to operate the cameras and/or sensors onboard such vehicles and to perform signal processing on the images and/or sensor data by one or more computers onboard such vehicles. A conventional power system in a vehicle is generally developed to support the vehicle's original equipment manufacturer (OEM) systems. Thus, conventional vehicle power system does not support the level of safety, power budget, and complexity that is needed to operate the various additional devices in an autonomous vehicle. This patent document describes several exemplary embodiments for a power distribution architecture that can improve reliability, redundancy, fault detection mitigation, state-of-health monitoring, and electromagnetic interference (EMI) filtering. The exemplary power distribution architecture can also incorporate a modular design that can provide backward compatibility with older OEM systems (e.g., OEM system operating at 12-volt), can provide power to devices in a vehicle that facilitate autonomous driving operation (e.g., devices operating at 12-volt and/or 24-volt), and can also provide power to new higher voltage systems (e.g., devices operating at 48-volt).

This patent document will first provide an overview of an exemplary power distribution system for vehicles in Section I. Next, the patent document will describe a first exemplary power distribution system in Section II followed by a description of a battery bridge units employed in the exemplary power distribution systems in Section III. Thereafter, the patent document will describe a power distribution unit employed in the exemplary power distribution systems in Section IV. Finally, the patent document will describe the second and third exemplary power distribution systems in Sections V and VI, respectively. The example headings for the various sections below are used to facilitate the understanding of the disclosed subject matter and do not limit the scope of the claimed subject matter in any way. Accordingly, one or more features of one example section can be combined with one or more features of another example section.

I. Overview of Exemplary Power Distribution System

Figure 1:
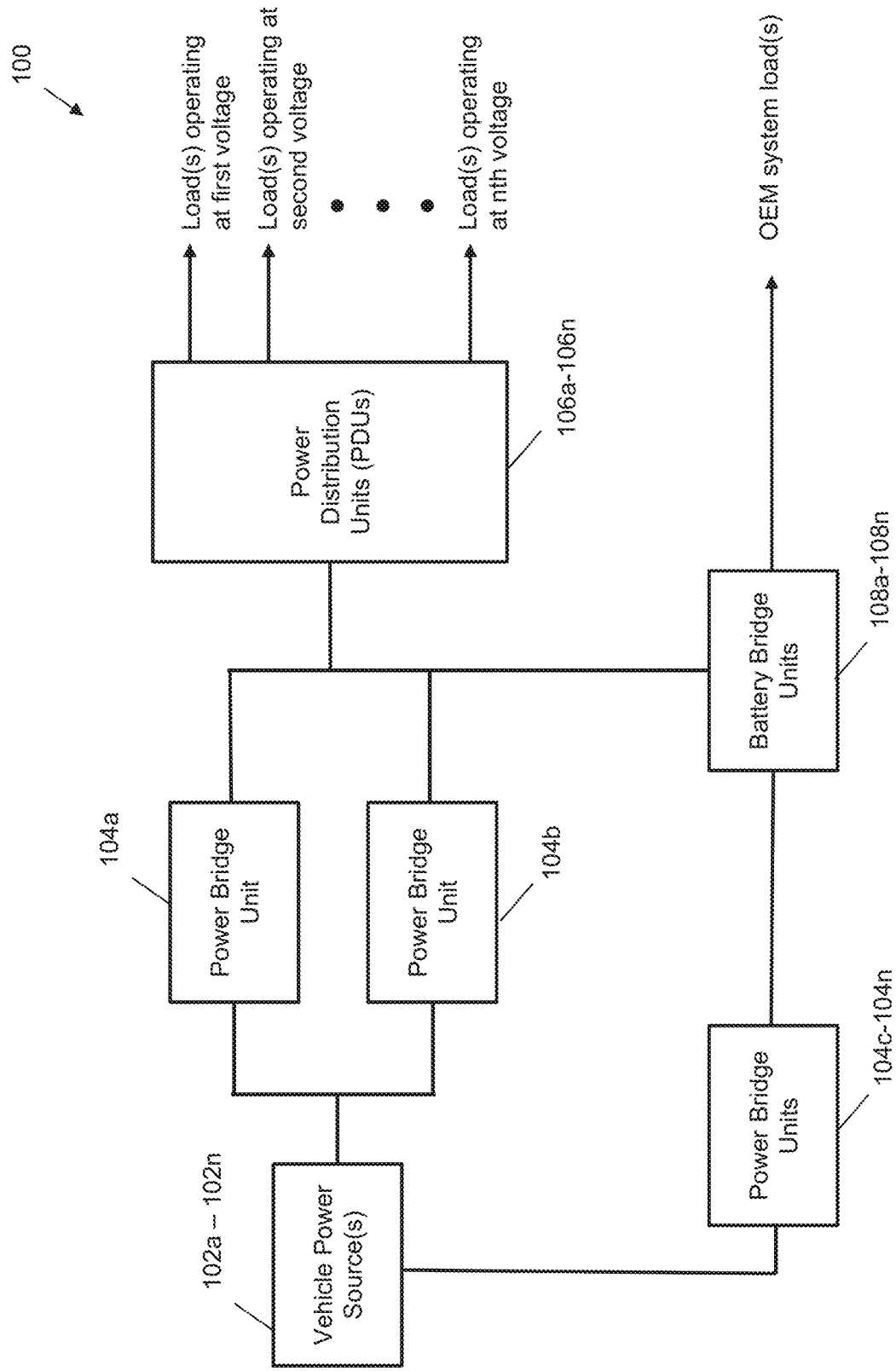
FIG. 1 shows a block diagram that provides an overview of an exemplary power distribution system for a vehicle.

FIG. 1 shows a block diagram that provides an overview of an exemplary power distribution system 100 for a vehicle. The exemplary power distribution system 100 includes at least four sets of components: vehicle power sources 102a-102n, power bridge units 104a-104n, power distribution units 106a-106n, and battery bridge units 108a-108n. The vehicle power sources 102a-102n produce an output voltage to operate one or more devices in the vehicle. The vehicle power sources 102a-102n may include one or more alternators and a shore charger located in the vehicle. A shore charger is a device that can include a transformer with half or full wave diode rectifier design that can receive electrical power (e.g., 120-volts AC) from a standard electrical connector when a vehicle is parked and can convert the input alternating current (AC) voltage to an output direct-current (DC) voltage to operate one or more devices in the vehicle.

The vehicle power sources 102a-102n are electrically coupled to a corresponding power bridge units 104a-104n so that each vehicle power source is electrically coupled to a power bridge unit. Each power bridge unit may include a single pole switch or a solid-state relay that can be controlled by a power bridge module (725 in FIG. 7) in an onboard computer located in the vehicle. The output of a vehicle power source is electrically coupled to an input of the single pole switch or the solid-state relay, and the output of the single pole switch or the solid-state relay is electrically coupled to an electrical bus to which a bank of battery bridge units is electrically coupled. Each power bridge unit may also sensor(s) electrically coupled to the input of the single pole switch or the solid-state relay, where the sensor(s) can measure voltage and/or current drawn from a respective vehicle power source. In each power bridge unit, the sensor is communicably coupled to a microcontroller. As further explained in Section II, based on the measured voltage and/or current values, the microcontroller in each power bridge unit can determine whether a fault condition exists (e.g., overcurrent or undervoltage) so that the microcontroller can instruct the single pole switch or solid-state relay to open and disconnect the power from the power distribution units 106a-106n.

Figure 8:
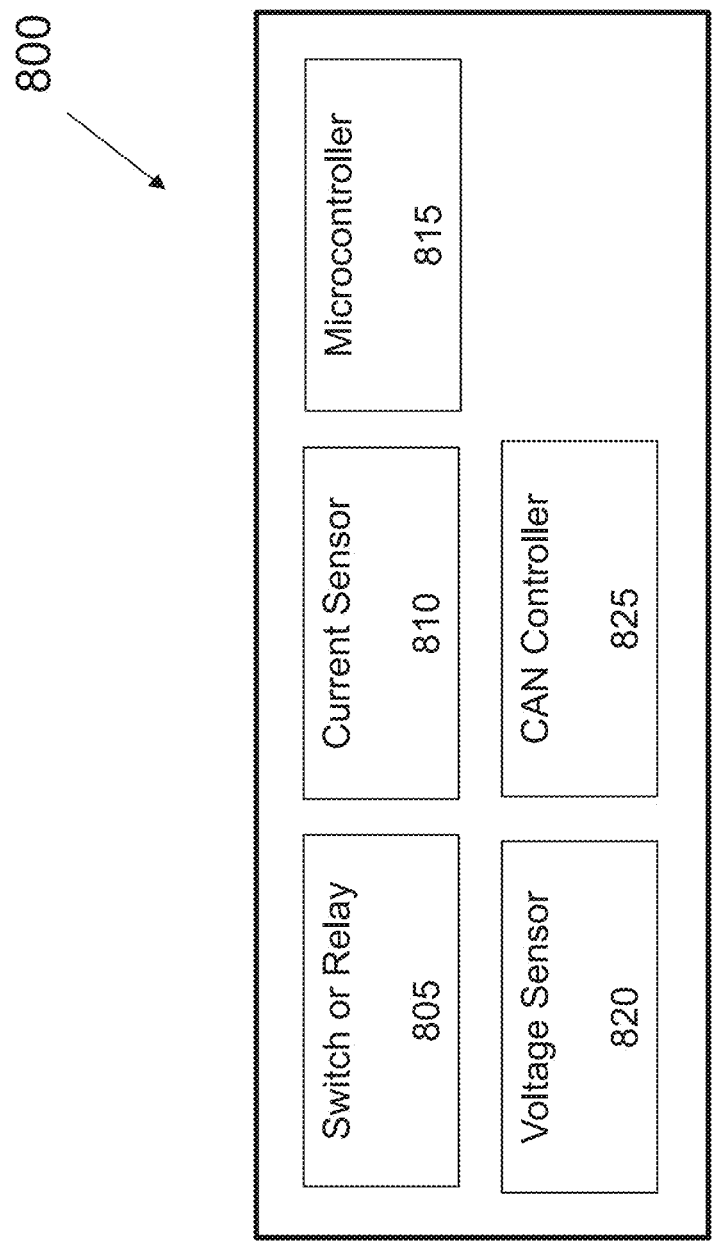
FIG. 8 shows an exemplary block diagram of a power bridge unit.

FIG. 8 shows an example block diagram of a power bridge unit. The power bridge unit 800 may include an electrical switch or a relay 805, a current sensor 810 that measures an amount of current flowing through the electrical switch or the relay. The power bridge unit 800 may also include a voltage sensor 820 that measure voltage of a terminal in the power bridge unit (e.g., an input of the power bridge unit that is electrically coupled to a power source). The power bridge unit 800 also includes a microcontroller 815 that is communicably coupled to the electrical switch or the relay and to the current sensor or the voltage sensor. The microcontroller 815 is configured to instruct the electrical switch or the relay to open in response to determining either that the measured current is greater than a first threshold value or that the measured voltage is greater than a second threshold value. The power bridge unit 800 may also include a controller area network (CAN) controller through which the onboard computer located in the vehicle can communicate with the power bridge unit 800.

In this patent document, the term "electrically coupled" can include direct or indirect electrical coupling. For example, a direct electrical coupling can include when two devices (e.g., 204a and 208a in FIG. 2) are electrically coupled to a same electrical bus (e.g., 210a), an indirect electrical coupling can include when two devices (e.g., 202a and 208d) are electrically coupled via another device(s) (e.g., 208a and/or 208b).

As shown in FIG. 1, the inputs of at least two power bridge units 104a, 104b are electrically and respectively coupled to the outputs of at least two power sources 102a, 102b. The outputs of the two power bridge units 104a, 104b are electrically coupled so that the two power bridge units 104a, 104b can be instructed to select between one of two power sources 102a, 102b to output a voltage to the power distribution units 106a-106n. For example, when a parked vehicle is turned on as it receives power from a shore charger, a power bridge module (725 in FIG. 7) can send instruction to a power bridge unit 104a electrically coupled to an alternator to close its switch and can send instructions to a power bridge unit 104b electrically coupled to the shore charger to open its switch so that the power output of the alternator can be directed to the power distribution units 106a-106n. The features of the vehicle power sources 102a-102n and the power bridge units 104a-104n are further described in FIGS. 2-4 and the various embodiments in this patent document.

The power distribution units 106a-106n are electrically coupled to and receive power from the power bridge units 104a, 104b and the battery bridge units. The power distribution units 106a-106n direct power to loads or devices operating at different voltages. In some embodiments, each power distribution unit can include an EMI filter to suppress electromagnetic noise for power sensitive devices (e.g., Ethernet switch) that operate on the vehicle. In some embodiments, each power distribution unit can also include a solid-state relay that can be controlled by a power distribution module (730 in FIG. 7) in an onboard computer located in the vehicle. The power distribution module can instruct the solid-state relay to switch on or off and thereby provide or not provide power to switched devices on the vehicle. The features of the power distribution units 106a-106n are further described in FIG. 6 and the various embodiments in this patent document.

As further explained below in FIGS. 2-4, the battery bridge units 108a-108n are arranged in two or more banks, where each bank includes two or more battery bridge units. Thus, one end of at least some of the battery bridge units 108a-108n are electrically coupled to the output of the power bridge units 104a, 104b and the inputs of the power distribution units 106a-106n. Each battery bridge unit can include a battery that is manufactured to have a same charge capacity and is designed to operate at a same nominal or reference voltage (e.g., 12-volts). Each battery bridge unit can also include a cell balancer unit that can prevent against over-charging the battery, current and/or temperature sensors to measure the amount of current and/or temperature of the battery, and a safety disconnect switch with one end electrically coupled to an anode terminal of a battery and another end electrically coupled to either a vehicle power source or another battery bridge unit. Each battery bridge unit can also include a microcontroller unit (MCU) that can instruct the safety disconnect switch to disconnect the battery from a vehicle power source or another battery bridge unit. The features of the battery bridge units 108a-108n including the cell balancer unit, safety disconnect switch and MCU are further described in FIG. 5A and the various embodiments in this patent document.

The battery bridge units 108a-108n is also electrically coupled to OEM system loads so that the output of the battery bridge units 108a-108n can sends power to OEM devices operating on the vehicle. In some embodiments, the battery bridge units 108a-108n are optionally electrically coupled to the output of one or more additional power bridge units 104c-104n that are respectively and electrically coupled to one or more additional vehicle power sources 102c-102n.

Figure 2:
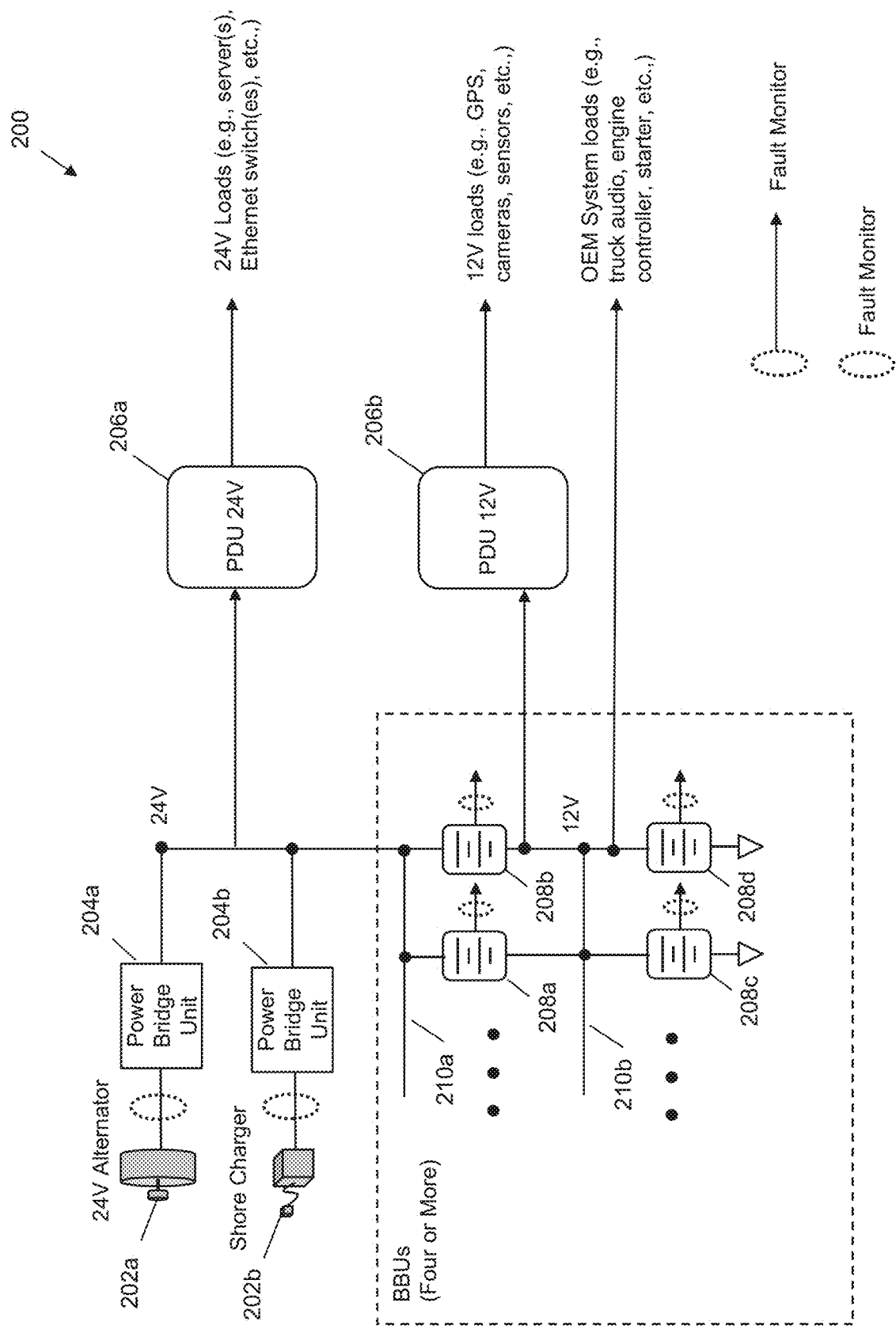
FIG. 2 shows a first exemplary power distribution system that includes two alternative vehicle power sources and four or more battery bridge units.
Figure 3:
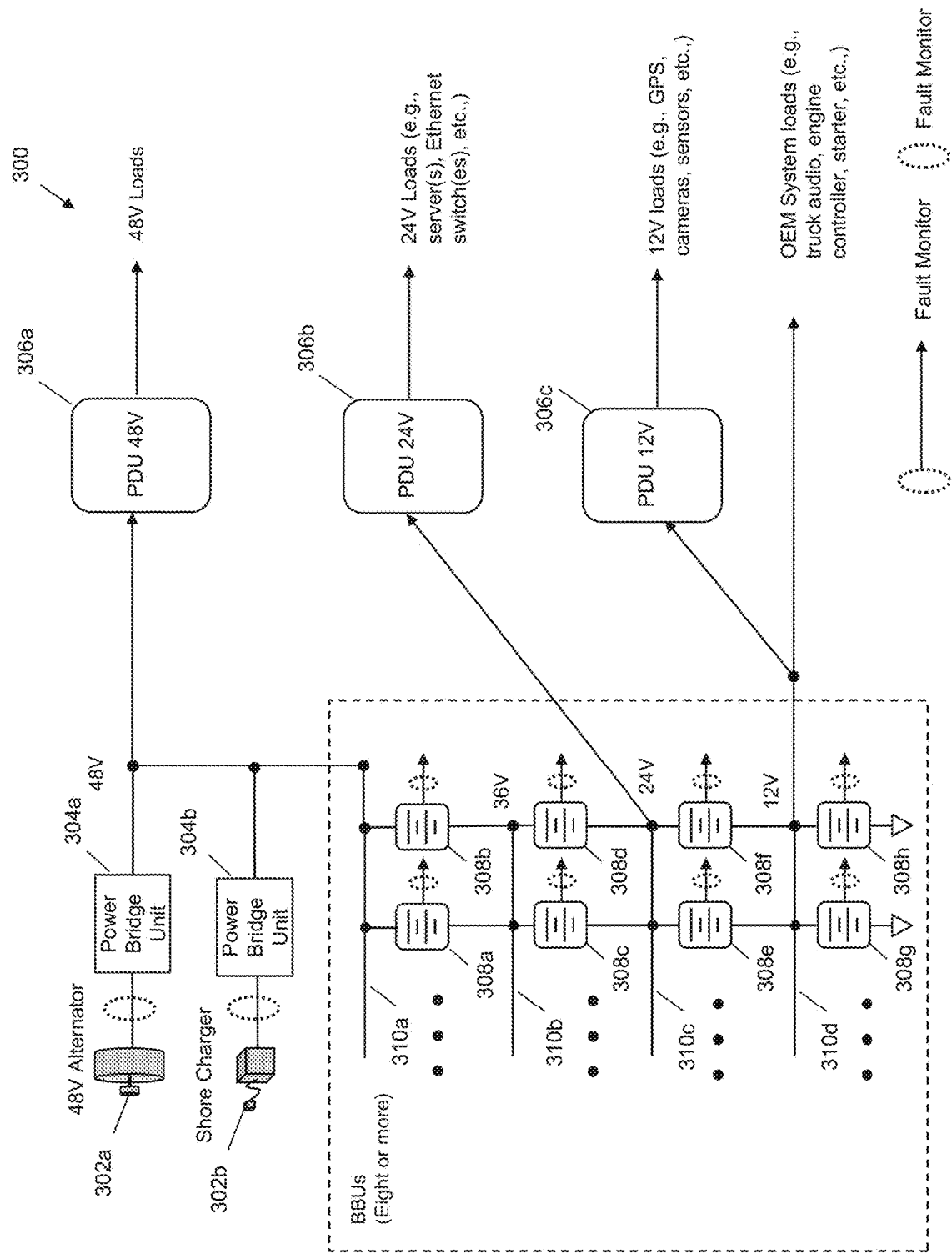
FIG. 3 shows a second exemplary power distribution system that includes two alternative vehicle power sources and eight or more battery bridge units.
Figure 4:
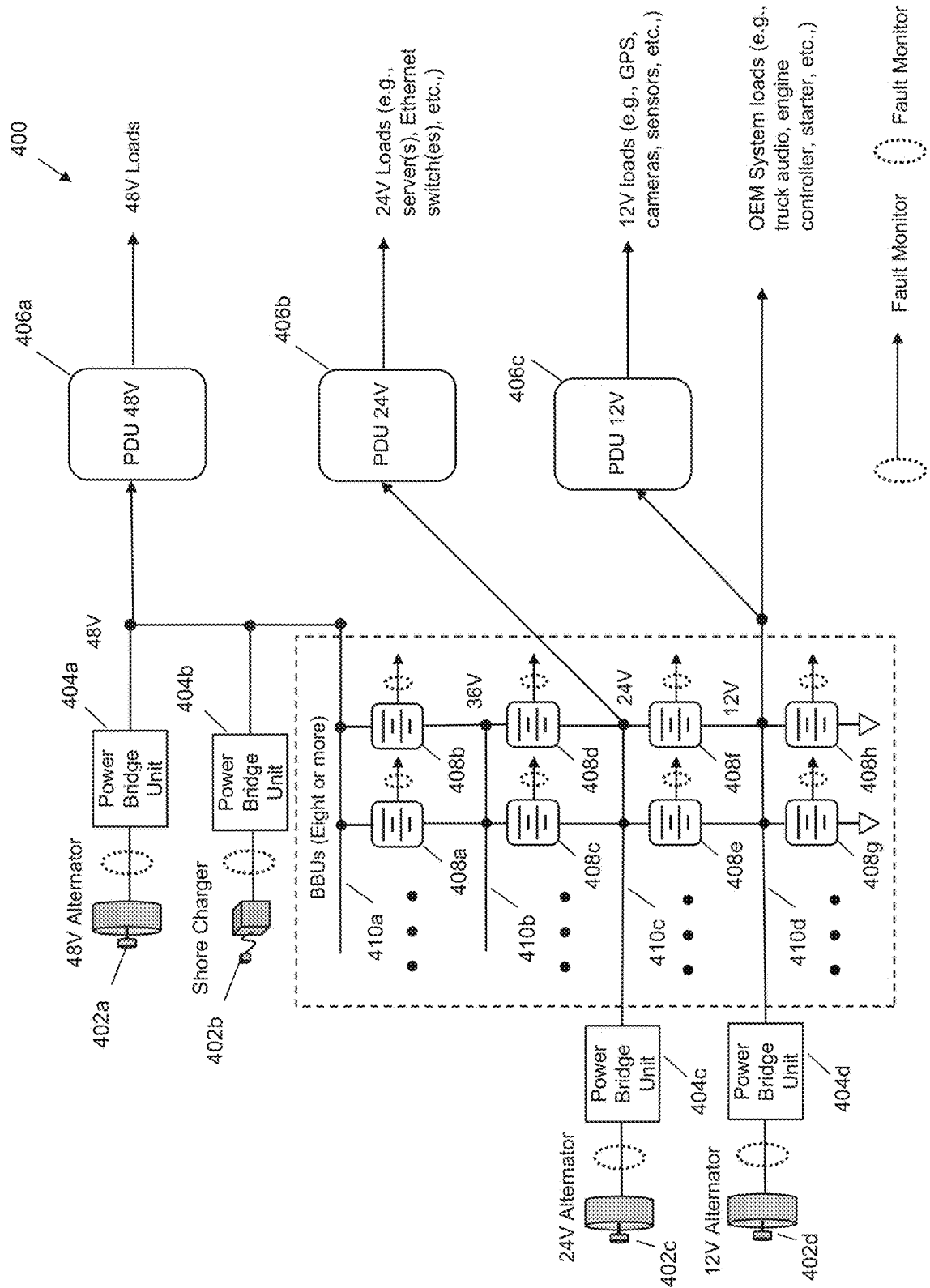
FIG. 4 shows a third exemplary power distribution system that includes two alternative vehicle power sources, one or more additional vehicle power sources, and eight or more battery bridge units.

FIGS. 2-4 show three exemplary power distribution systems 200, 300, 400 that describe various configurations of the vehicle power sources 102a-102n, power bridge units 104a-104n, power distribution units 106a-106n, and battery bridge units 108a-108n.

II. First Exemplary Power Distribution System Embodiment

FIG. 2 shows a first exemplary power distribution system 200 that includes two alternative vehicle power sources 202a, 202b and four or more battery bridge units 208a-208d. A first vehicle power source 202a is an alternator that generate and outputs 24-volts DC, and a second vehicle power source 202b is a shore charger that can alternatively generate and output 24-volts DC when connected to an electrical outlet when the vehicle is parked. The output of the first vehicle power source 202a is electrically coupled to an input of a first power bridge unit 204a, and the output of the second vehicle power source 202b is electrically coupled to an input of a second power bridge unit 204b. The power bridge units are also known as the power bridge devices.

Each power bridge unit include current and/or voltage sensors and a microcontroller to monitor the output of the vehicle power source for electrical faults (e.g., overcurrent, undercurrent, overvoltage, and/or undervoltage). Thus, the two power bridge units 204a, 204b respectively monitor for electrical faults on the outputs of the vehicle power sources 202a, 202b as indicated in FIG. 2 with dashed circles. Each power bridge unit also includes a single pole switch or a solid-state relay that is communicably coupled to the microcontroller and that is independently operated by the microcontroller in each power bridge unit. The single pole switch or solid-state relay is electrically coupled in series between the input and output of a power bridge unit. If a microcontroller receives voltage and/or current values measured by the voltage and/or current sensors and determines that the received voltage and/or current values is higher than or lower than reference voltage threshold(s) and/or reference current threshold(s), then the microcontroller can instruct the single pole switch or solid-state relay to open to disconnect the vehicle power source from the power distribution units and the battery bridge units. Thus, the microcontroller, voltage and/or current sensors, and single pole switch or solid-state relay in each power bridge unit can operate independently to disconnect a vehicle power source from the vehicle's loads in the event of a fault.

The outputs of the two power bridge units 204a, 204b are electrically coupled so that the two power bridge units 204a, 204b can be instructed by a power bridge module (725 in FIG. 7) to select between either the alternator or the shore charger to provide an output voltage to the power distribution units 206a-206b and OEM loads. Thus, the two power bridge units 204a, 204b alternatively and electrically couple the two vehicle power sources 202a, 202b to the first power distribution unit 206a, the battery bridge units 208a-208d (referred to as BBUs in FIG. 2), the second power distribution unit 206b, and OEM loads.

The outputs of the two power bridge units 204a, 204b are electrically coupled to an input of the first power distribution unit 206a. When the single pole switch or solid-state relay in either of the two power bridge units 204a, 204b is closed, a first voltage (e.g., 24-volts) is sent to the first power distribution unit 206a. As an example, when the single pole switch or solid-state relay in the first power bridge unit 204a is closed while the single pole switch or solid-state relay in the second power bridge unit 204b is open, a first voltage (e.g., 24-volts) produced at the output of the alternator is sent to the first power distribution unit 206a. The first power distribution unit 206a can include various devices as further described in FIG. 6 to receive the first voltage from a vehicle power source and to output the first voltage to a set of devices electrically coupled to the output of the first power distribution unit 206a, where the set of devices operate at the first voltage.

The two power bridge units 204a, 204b alternatively and electrically couple the two vehicle power sources 202a, 202b to the battery bridge units 208a-208d. The battery bridge units 208a-208d are arranged in two banks connected in series with each bank having two or more battery bridge units electrically coupled in parallel. Each bank of batteries is connected in series to at least one other bank of batteries. In FIG. 2, the first bank of BBUs (208a, 208b) is immediately adjacent to and in series with a second bank of BBUs (208c, 208d). The first exemplary power distribution system 200 as shown in FIG. 2 includes two banks of batteries where each of the first bank of batteries 208a-208b has a one end (shown as first electrical terminal 512a in FIG. 5A) that is electrically coupled to a first electrical bus 210a, where the first electrical bus 210a is also electrically coupled to the outputs of the two power bridge units 204a, 204b. Each of the first bank of batteries 208a-208b also has another end (shown as second electrical terminal 512b in FIG. 5A) that is electrically coupled to a second electrical bus 210b, where the second electrical bus 210b is also electrically coupled to the first electrical terminal of each of the second bank of batteries 208c-208d. A second electrical terminal of each of the second bank of batteries 208c-208d is electrically coupled to electrical ground.

In the first bank of batteries, two or more battery bridge units 208a-208b are electrically coupled in parallel by having a same first electrical terminal of each of the two or more battery bridge units 208a-208b electrically couple to the first electrical bus 210a and by having a same second electrical terminal of each of the two or more battery bridge units 208a-208b electrically couple to the second electrical bus 210b. In the second bank of batteries connected in series with the first bank of batteries, two or more battery bridge units 208c-208d are electrically coupled in parallel by having a same first electrical terminal of each of the two or more battery bridge units 208c-208d electrically couple to the second electrical bus 210b and by having a same second electrical terminal of each of the two or more battery bridge units 208c-208d electrically couple to electrical ground. A bank of batteries may also be referred to as a row of batteries.

Each of the four or more battery bridge units 208a-208d can be identical and may include a battery manufactured to have a same charge capacity and a same nominal or reference voltage (e.g., 12-volts). Thus, the first bank of batteries in series with the second bank of batteries produces or outputs a first voltage (e.g., 24-volts) at the first electrical bus 210a and the second bank of batteries produces or outputs a second voltage (e.g., 12-volts) at the second electrical bus 210b. The second electrical bus 210b, the first electrical terminals of the second bank of two or more batteries 208c-208d, and the second electrical terminals of the first bank of batteries 208a-208b is electrically coupled to a second power distribution unit 206b. The power distribution units 206a, 206b can have the same architecture and is further described in FIG. 6. In some embodiments, the second electrical bus 210b, the first electrical terminals of the second bank of two or more batteries 208c-208d, and the second electrical terminals of the first bank of batteries 208a-208b is also electrically coupled to the vehicle's OEM devices (e.g., truck audio engine controller unit, starter, etc.).

Figure 5A:
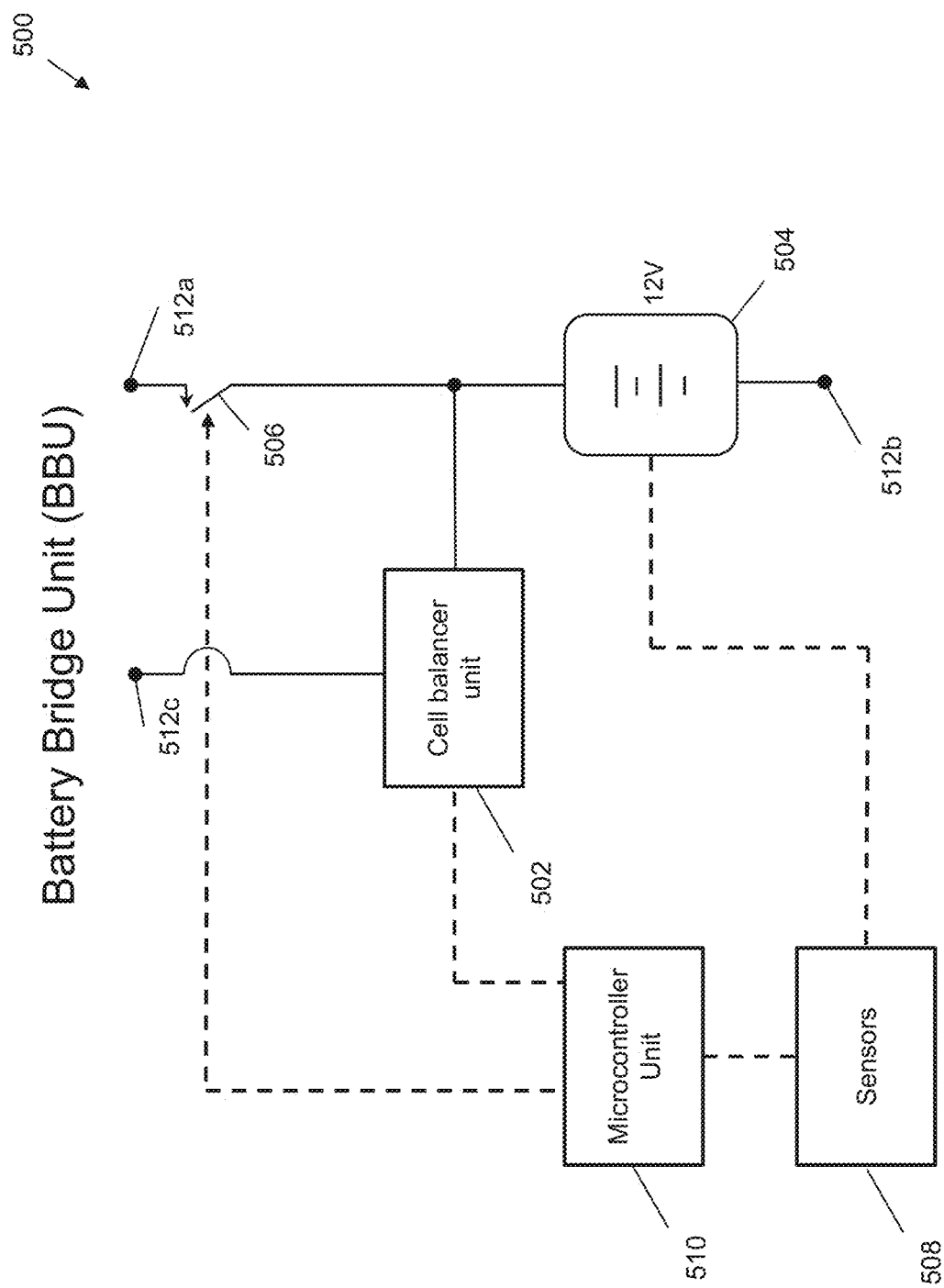
FIG. 5A shows an exemplary block diagram of a battery bridge unit.

Coupling of OEM loads and the 12-volt loads to one or more lower banks of the battery bridge units via the second electrical bus 210b is an unconventional but advantageous technical feature. OEM loads or a 12-volt loads electrically coupled to batteries in the middle of the two or more battery banks can lead to batteries having unbalanced charge states. An unbalanced charge state can be described as two or more batteries being charged to different charge levels after one of the batteries has been discharged to a level greater than another battery. In a conventional power distribution system, one way to mitigate against having unbalanced batteries is to have the OEM loads and the 12-volt loads be electrically coupled to an output of a voltage converter that receives and converts 24-volts from the power bridge unit 204a to 12-volts. However, such a conventional system is inefficient at least because the voltage converter experiences power loss as it inefficiently converts 24-volts to 12-volts. Thus, a technical advantage of electrically coupling the OEM loads and the 12-volt loads to the battery bridge units via the second electrical bus 210b is that it can minimize the amount of power loss compared to conventional power distribution systems that use a voltage converter. Furthermore, as described in Section III, the electrical design of the battery bridge unit includes a cell balancer unit that can mitigate against having batteries with unbalanced change states when such batteries are electrically coupled to vehicle loads. Each battery bridge unit described in FIGS. 2-4 can be implemented as shown in FIG. 5A.

The power distribution system architecture described in Section II is further described below. A first exemplary power distribution system includes a first and second means for providing electrical power at a first voltage in the vehicle, and a first and second means for electrically coupling either the first means for providing electrical power or the second means for providing electrical power to a first power distribution unit (PDU) also known as power distribution device (PDD). The first means for providing electrical power can be an alternator and the second means for providing electrical power can be a shore power device. The first means for electrically coupling can include a first power bridge unit and the second means for electrically coupling can include a second power bridge unit. A same terminal of the first and second means for electrically coupling are electrically coupled to a first electrical bus that is electrically coupled to an input terminal of the first PDU. The first PDU is configured to provide electrical power to a first set of devices that operate at a first voltage in the vehicle.

The first exemplary power distribution system also includes two or more banks of means for receiving electrical power from either the first or second means for providing electrical power and for providing electrical power at the first voltage to the first set of devices and to provide electrical power at a second voltage to a second set of devices in the vehicle. The two or more banks of means for receiving electrical power and means for providing electrical power can include two or more banks of BBUs. Each means for receiving electrical power and for providing electrical power comprises: a first terminal electrically coupled to an anode of a battery, a cell balancer unit configured to discharge the battery upon determining that the battery is in an over-charged condition, where a first end of a cell balancer is electrically coupled to the first terminal, a second terminal electrically coupled to a cathode of the battery, and a third terminal electrically coupled to a second end of the cell balancer unit.

In the first exemplary power distribution system, the means for receiving electrical power and for providing electrical power can be a battery bridge unit (BBU) also known as battery bridge device (BBD). In the first exemplary power distribution system, first terminals of two or more BBUs in a first bank of BBUs are electrically coupled to the first electrical bus, second terminals of the two or more BBUs in the first bank of BBUs are electrically coupled to a second electrical bus, first terminals of two or more BBUs in a second bank of BBUs is electrically coupled to the second electrical bus, second terminals of the two or more BBUs in the second bank of BBUs is electrically coupled to electrical ground, and third terminals of the two or more BBUs in the first bank of BBUs and in the second banks of BBUs is electrically coupled to the first electrical bus. The first exemplary power distribution system also includes a second PDU electrically coupled to the second electrical bus, where the second PDU is configured to provide electrical power to the second set of devices that operate at the second voltage in the vehicle.

III. Battery Bridge Unit

FIG. 5A shows an exemplary block diagram of a battery bridge unit 500 that can be used in the two or more banks of battery bridge units in the exemplary power distribution systems shown in FIGS. 2-4. The electrical design of the battery bridge unit 500 is an advantageous technical feature at least because it can allow a same battery bridge unit to be used in the two or more banks of battery bridge units shown in FIGS. 2-4.

A battery bridge unit 500 includes three electrical terminals. A first electrical terminal 510a is electrically coupled to a first end of a safety disconnect switch 506, where a second end of the safety disconnect switch 506 is electrically coupled to an anode terminal of a battery 504. The first electrical terminal 510a is electrically coupled to either an output of the power bridge units or to a second electrical terminal 512b of other battery bridge units depending on the location of the battery bridge unit in the two or more banks shown in FIGS. 2-4. For example, in FIG. 2, the first terminal 510a of battery bridge unit 208a is electrically coupled to the outputs of the power bridge units 204a, 204b via the first electrical bus 210a, and the first terminal 510a of the battery bridge unit 208c is electrically coupled to the second electrical terminal 512b of the battery bridge units 208a, 208b via the second electrical bus 210b. For the three exemplary power distribution systems of FIGS. 2-4, each battery bridge unit 500, the third electrical terminal 512c can electrically couple one end of the cell balancer unit 502 to the first electrical bus (210a, 310a, 410a) to which the outputs of the power bridge units (204a and 204b, or 302a and 302b, or 402a and 402b) are electrically coupled.

A battery bridge unit 500 includes a battery manufactured to have a charge capacity and designed to operate at a nominal or reference voltage (e.g., 12-volts). The anode terminal of the battery 504 is electrically coupled to a second end of the safety disconnect switch 506, and the cathode terminal of the battery 504 is electrically coupled to the second electrical terminal 512b.

A battery bridge unit 500 includes a cell balancer unit 502 that is communicably coupled to the microcontroller unit (MCU) 510. The cell balancer unit 502 operates as a current source to discharge the battery 504 upon determining that the battery 504 is in an over-charged condition. FIG. 5C shows an exemplary block diagram of the cell balancer unit 502 that can include a programmable comparator 530 and a switching converter 525 that can prevent against overcharging a battery (e.g., 504 in FIG. 4A). Typically, a battery's state of charge can be a function of at least the battery's voltage. The programmable comparator can be used to determine whether the battery is in an over-charged condition. In a first exemplary embodiment, the MCU 510 can provide a configurable reference voltage (e.g., 14.7-volts) to a first input of the programmable comparator, and a second input of the programmable comparator is electrically coupled to the anode of the battery 504 to provide the second input with the voltage across the battery 504. The output of the programmable comparator can be electrically coupled to an input of switching converter and to the MCU 510. The output of the switching converter can be electrically coupled to the third electrical terminal 512c.

In the first exemplary embodiment, if the programmable comparator determines that the battery voltage exceeds the reference voltage, then the programmable comparator can generate an output voltage (e.g., 3.3-volts) that indicates that the battery voltage exceeds the reference voltage. The output voltage of the programmable comparator associated with an over-voltage (or over-charge) scenario, when sensed or received by an input of the switching converter, turns on the switching converter. By turning on the switching converter, the cell balancer unit operates as a current source and discharges the over-charged battery into the first electrical bus (210a in FIG. 2, 310a in FIG. 3, and 410a in FIG. 4) to which devices in the vehicle and other battery bridge units are electrically coupled. If, after the battery 504 discharges, the programmable comparator determines that the battery voltage is less than the reference voltage, then the programmable comparator can generate another output voltage (e.g., 0-volt) that turns off the switching converter so that the battery 504 can resume charging.

In a second exemplary embodiments, the MCU 510 can provide two configurable reference voltages (e.g., 14.7-volts and 13.0-volts) to a first input and second inputs of the programmable comparator to employ a hysteresis charging/discharging technique, and a third input of the programmable comparator is electrically coupled to the anode of the battery 504 to provide the third input with the voltage across the battery 504. In the second exemplary embodiment, if the programmable comparator determines that the battery voltage exceeds the greater of the two reference voltages (e.g., 14.7-volts), then the programmable comparator can generate an output voltage (e.g., 3.3-volts) that, when sensed or received by an input of the switching converter, turns on the switching converter. If, after the battery 504 discharges, the programmable comparator determines that the battery voltage is less than the lesser of the two reference voltages (e.g., 13.0-volts), then the programmable comparator can generate another output voltage (e.g., 0-volt) turns off the switching converter so that the battery 504 can resume charging.

Since the output of the cell balancer unit of each battery bridge unit is electrically coupled the same first electrical bus (210a in FIG. 2, 310a in FIG. 3, and 410a in FIG. 4), a switching converter can be a direct current-direct current (DC-DC) converter that can be programmable by the MCU 510 based on the location of the battery bridge module in the two or more banks. For example, in FIG. 2, the top bank of battery bridge units 208a, 208b each include a cell balancer unit that includes a switching converter that can convert 24-volts from the anode of the battery to electrical ground to 24-volts, and the bottom bank of battery bridge units 208c, 208d each include a cell balancer unit that includes a switching converter that can convert 12-volts from the anode of the battery to electrical ground to 24-volts. In some embodiments, a switching converter can be programmed to convert 12-volts to 48-volts, or 24-volts to 48-volts or 48-volts to 48-volts where a battery bridge unit can employ such a programmable switching converter in the second and third exemplary power distribution systems 300, 400 as shown in FIGS. 3 and 4.

Figure 5B:
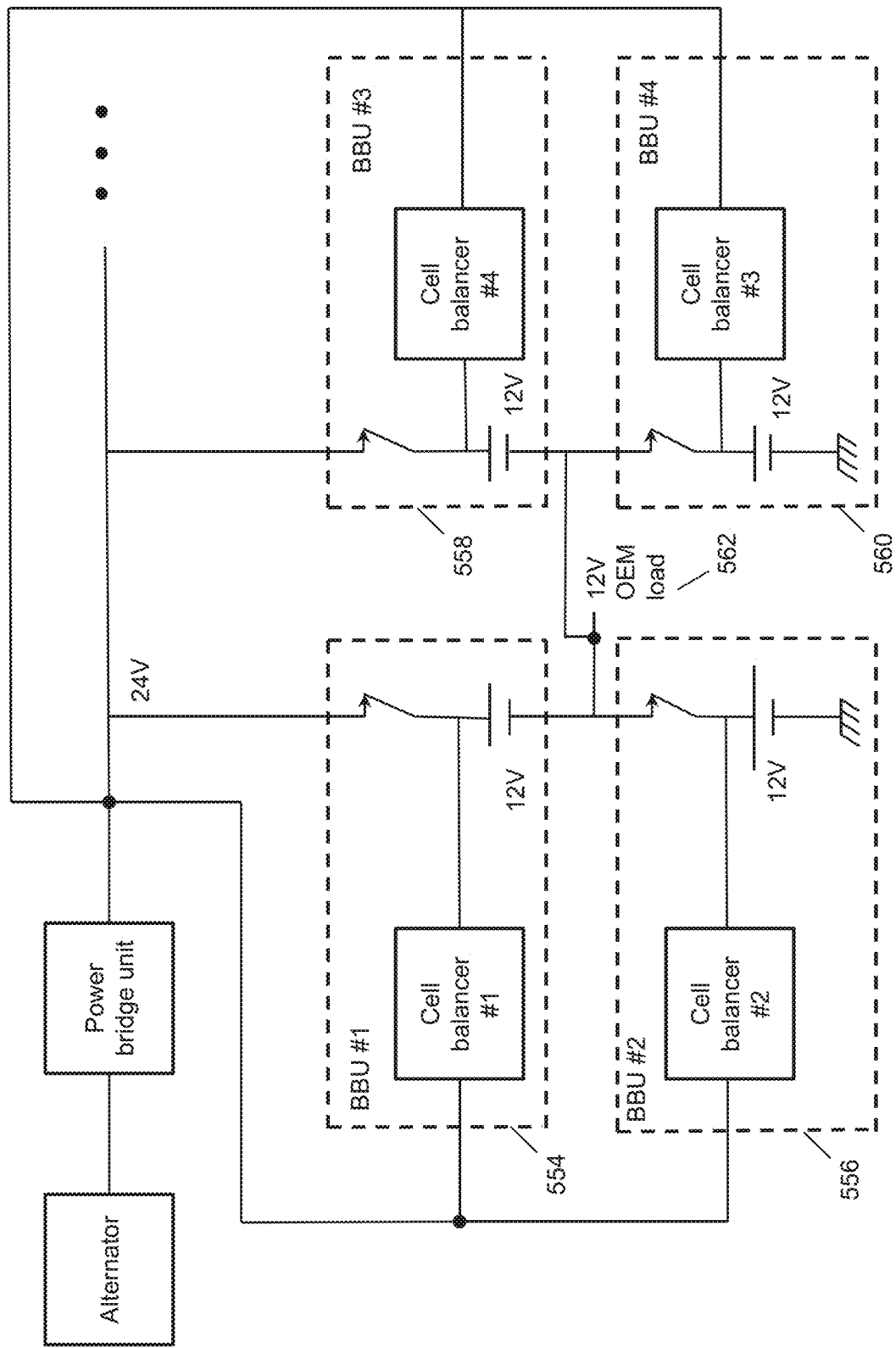
FIG. 5B shows a portion of the first exemplary power distribution system with four cell balancer units in four battery bridge units.
Figure 5C:
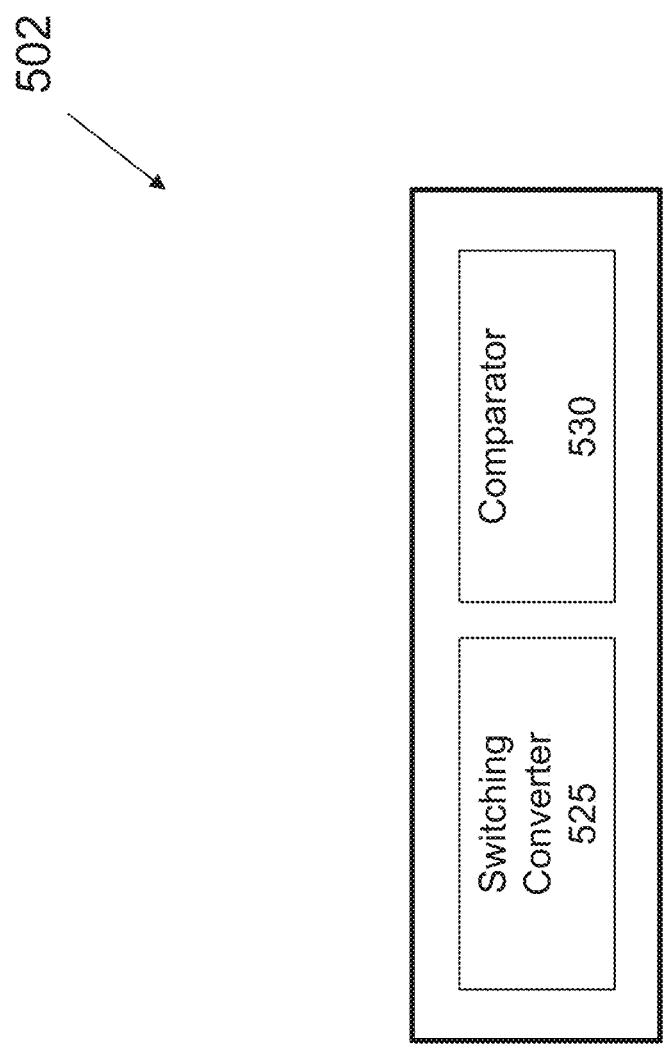
FIG. 5C shows an exemplary block diagram of the cell balancer unit.

FIG. 5B shows a portion of the first exemplary power distribution system with four cell balancer units in four battery bridge units. For ease of description, the block diagram of FIG. 5B shows only a portion of first exemplary power distribution system with an alternator as a vehicle power source, a power bridge unit, and four battery bridge units. The operations of the cell balancer units described in FIG. 5B can be applicable to additional battery bridge units. The presence of a cell balancer unit in each battery bridge unit is an advantageous technical feature for battery bridge units connected in series in two or more banks. When batteries are connected in series in two or more banks and when a load is electrically coupled to one or more banks of batteries, there is a risk of over-charging batteries and there is a risk of having batteries with unbalanced state of charge. One of the benefits of the cell balancer unit in each battery bridge unit is that it can extend battery life by minimizing the scenario where a battery is over-charged.

The technical benefits of the cell balancer unit are further described in the following example. In FIG. 5B, if a 12-volt vehicle starter OEM device 562 draws a significant amount of current to start the vehicle, the battery in the battery bridge module 554 may not discharge as much as the battery in battery bridge module 556. Thus, after the vehicle starter has drawn the current needed for its operation, the battery in battery bridge module 556 may need to be charged more than and may have a lower voltage than the battery in the battery bridge module 554.

In the above example, the batteries in both the battery bridge units 554, 556 can be simultaneously charged. Since a battery's state of charge can be a function of at least the battery's voltage, the battery in battery bridge unit 554 can have a higher voltage than the voltage of the battery in battery bridge unit 556. In the above example, when charging both batteries in battery bridge units 554, 556, the voltage of the battery in battery bridge unit 554 may likely exceed a reference voltage, while the voltage of the battery in battery bridge unit 556 may be below the same reference voltage or another lower reference voltage if a hysteresis technique is used as explained above. When the programmable comparator in cell balancer unit #1 turns or enables a switching converter in cell balancer unit #1, the switching converter discharges the battery in the battery bridge unit 554. However, the programmable comparator in cell balancer unit #2 turns off or disables the switching converter in cell balancer unit #2 so that the battery in battery bridge unit 556 continues to be charged.

If the programmable comparator in cell balancer unit #1 determines that a voltage of the battery in battery bridge unit 554 is below the reference voltage or another lower reference voltage if a hysteresis technique is used as explained above, then the programmable comparator turns off or disables the switching converter in cell balancer #1 so that the battery in the battery bridge unit 554 can be charged. In some embodiments, the process of charging and discharging the battery in the battery bridge unit 554 can continue so that the battery in the battery bridge unit 556 can be charged. In such embodiments, the cell balancer unit in each battery bridge unit can charge or discharge a battery so that each battery in the two or more banks can have the same state of charge or a state of charge within a range of values (e.g., between 13.5-volts and 14.0-volts).

In some embodiments, the process of charging and discharging the battery in the battery bridge unit 554 can be determined by averaging the voltage of the batteries in the four battery bridge units 554-560.

In FIG. 5A, a battery bridge unit 500 includes current and/or temperature sensors 508 to measure the amount of current and/or temperature of the battery 504. The current sensor can be electrically coupled to the battery 508 and the temperature sensor can be thermally coupled to a housing that includes the battery 508. The current and/or temperature sensors 508 are communicably coupled to the MCU 510 so that the MCU 510 can determine whether a fault condition exists based on the current and/or temperature values measured by the current and/or temperature sensors 508. The safety disconnect switch 506 is communicably coupled to the MCU 510. Thus, when an MCU determines a fault condition (e.g., overcurrent, undercurrent, over-temperature) exists, the MCU 510 can send a command to the safety disconnect switch 506 to open and disconnect the battery 504 from a vehicle power source. For example, the MCU 510 can compare the measured current provided by a current sensor to either a configurable reference current (e.g., 15 Amps) or to a range of reference currents (e.g., 5 Amps to 15 Amps). If the MCU 510 determines that the measured current either exceeds the configurable reference current or is outside the range of reference currents, then the MCU 510 can determine a fault condition and send a command to the safety disconnect switch 506 to open.

As shown in FIGS. 2-4, since the battery bridge units are connected in parallel in each bank, when one battery bridge unit's safety disconnect switch is opened due to a fault condition detected by the MCU in that battery bridge unit, the rest of the battery bridge units can still continue to operate. Thus, the architecture of the battery bridge units is an advantageous technical feature that can allow the exemplary power distribution systems to provide power to the various loads so long as at least one battery bridge unit on each bank is operating within its limits and has not experienced a fault condition.

In FIG. 5A, the MCU 510 in each battery bridge unit is communicably coupled to the onboard computer located in the vehicle. For example, each battery bridge unit may have a CAN controller through which the MCU 510 can send messages to the onboard computer's CAN controller (740 in FIG. 7). In some embodiments, if the MCU 510 in a battery bridge unit determines that the measured current either exceeds the configurable reference current or is greater than the highest current value in the range of reference currents, the MCU 510 can send a message indicating an overcurrent fault situation with the battery bridge unit's identification number (e.g., serial number) to the health module (735 in FIG. 7) in an onboard computer. In some embodiments, the MCU 510 can also send a message indicating an undercurrent fault situation where the measured current is either less than the configurable reference current or is less than the lowest current value in the range of reference currents.

The MCU 510 can also compare the measured temperature provided by a temperature sensor to a configurable reference high temperature (e.g., 85° F.) or to a range of reference temperatures (e.g., −40° F. to 85° F.). Thus, in some embodiments, if the MCU 510 in a battery bridge unit determines that the measured temperature either exceeds the configurable reference high temperature or is greater than the highest temperature value in the range of reference temperatures, the MCU 510 can send a message indicating an over-temperature fault situation with the battery bridge unit's identification number (e.g., serial number) to the health module (735 in FIG. 7) in an onboard computer. In some embodiments, the MCU 510 can also send a message indicating an under-temperature fault situation where the measured temperature is either less than a configurable reference low temperature or is less than the lowest temperature value in the range of reference temperatures.

In some embodiments, each battery bridge unit's MCU can provide a health information to the health module in an onboard computer. The health information can indicate whether the current drawn from the specific battery bridge unit and/or temperature of the battery bridge unit is within a range of reference values or is less than a reference value. For example, the health information can be a message that includes an identifier of a battery bridge unit (e.g., serial number) and the measured current and/or temperature values, or the health information can be a message that states that the battery bridge unit is operating at a "safe current level" and/or a "safe temperature level." In an example implementation, a MCU 510 may periodically send (e.g., every 2 seconds) health information of a battery bridge unit to the health module in the onboard computer.

IV. Power Distribution Unit (PDU)

Figure 6:
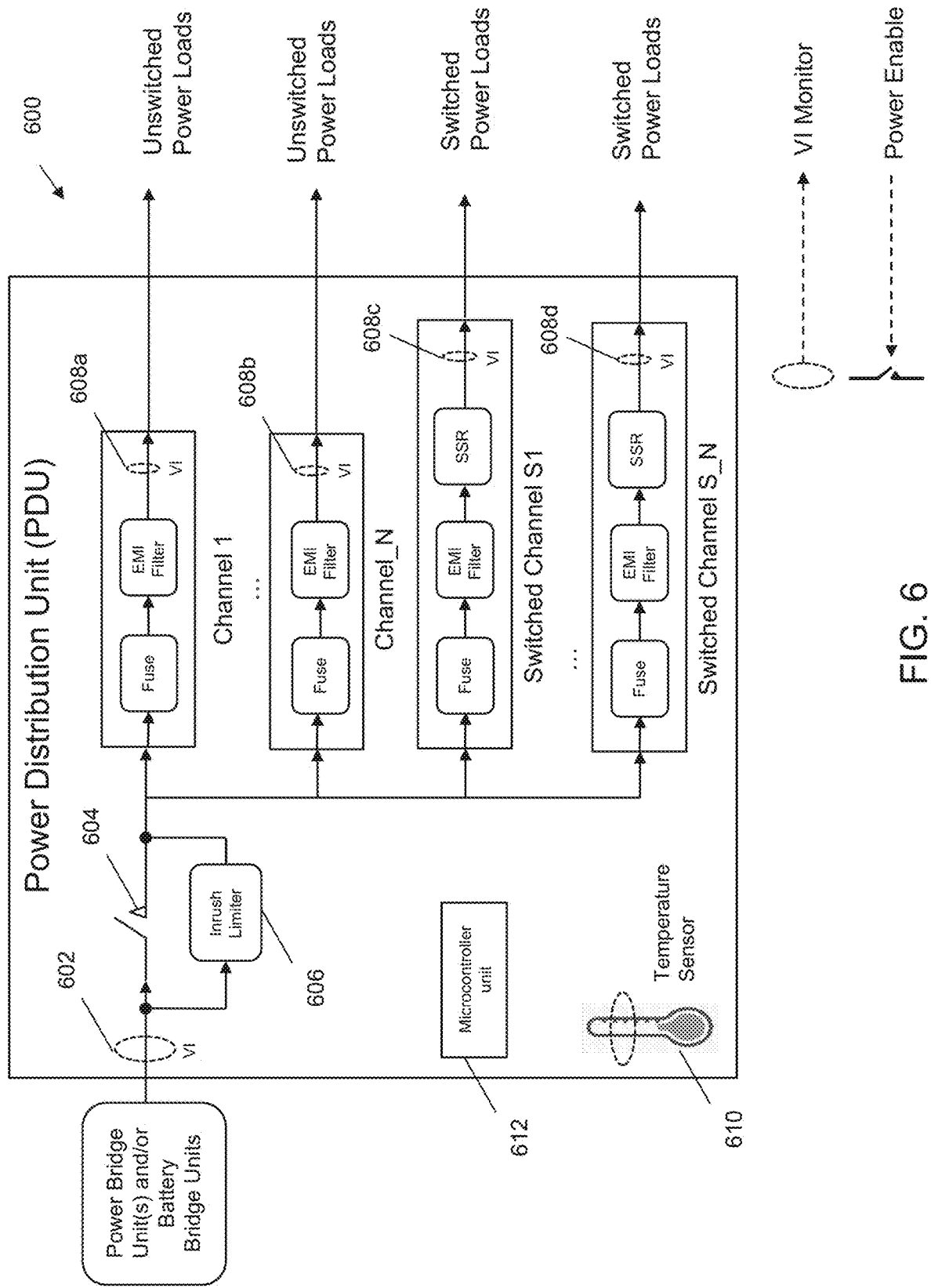
FIG. 6 shows an exemplary block diagram of a power distribution unit (PDU).

FIG. 6 shows an exemplary block diagram of a PDU 600 that can be used in the exemplary power distribution systems shown in FIGS. 2-4. The electrical design of the PDU 600 is an advantageous technical feature at least because it can allow a same PDU to be used in the exemplary power distribution systems shown in FIGS. 2-4. Thus, the various components of the PDU 600 can be rated to operate at one or more voltages, such as 12-volts, 24-volts, 48-volts or higher.

The PDU 600 receives power from the power bridge unit(s) and/or battery bridge units. As shown in FIGS. 2 and 4, a PDU is electrically coupled to an electrical bus that is directly electrically coupled to any one or more of power bridge units and battery bridge units. For example, in FIG. 2, the input terminal of the PDU 206a is electrically coupled to an electrical bus that is directly coupled to both the outputs of the power bridge units 204a, 204b and to the battery bridge units 208a-208d. In another example, in FIG. 3, the input terminal of the PDU 306b is electrically coupled to an electrical bus that is directly coupled to the battery bridge units 308c-308f, where the electrical bus is indirectly electrically coupled to the outputs of the power bridge units 304a, 304b.

The input terminal of the PDU is electrically coupled to a voltage sensor and current sensor indicated as "VI" in FIG. 6. The voltage sensor and current sensor ("VI sensors") respectively measure the voltage on the input terminal relative to electrical ground and current on the input terminal. The VI sensors are communicably coupled to the microcontroller so that the VI sensors provides current and voltage measurement values to the microcontroller. The microcontroller can determine whether a fault condition exists if either the measured current value or the measured voltage value is greater than a reference current threshold or a reference voltage threshold, respectively. If the microcontroller determines that either the measured current/voltage is greater than the reference current/voltage threshold, then the microcontroller can instruct the current relay 604 to open to disconnect the power bridge units and/or battery bridge units from the electrical device(s) electrically coupled to the PDU 600.

A PDU 600 includes an inrush limiter 606 electrically coupled in parallel to the current relay 604. The inrush limiter 606 can include at its input a switch that is electrically coupled to a series resistor, where the series resistor is electrically coupled to a bank of capacitors. When power is first applied to the PDU 600, the switch in the inrush limiter 606 closes and charges the bank of capacitors. The bank of capacitors is electrically coupled to an analog comparator in the inrush limiter. When the analog comparator determines that the voltage across the bank of capacitors reaches a threshold voltage, then the analog comparator generates an output to indicate to the current relay 604 to close its switch. By having the inrush limiter 606 charge up first and then close the current relay 604, the PDU 600 minimizes the changes of arcing the contacts of the current relay 604.

In FIG. 6, the PDU 600 includes a first set of unswitched channels Channel 1 to Channel_N, where an unswitched channel transfers voltage and current from its input to its output. The PDU 600 also includes a second set of switched channels Switched Channels S1 to Switched Channels S_N, where a switched channel transfers voltage and current from its input to its output if a solid-state relay (shown as "SSR" in FIG. 6) in the switched channel is instructed by a microcontroller unit 612 to close its relay. The PDU includes a microcontroller unit 612 that is communicably coupled to each solid-state relay in the switched channels. The microcontroller unit 612 in each PDU is communicably coupled to a power distribution module (730 in FIG. 7) in an onboard computer located in the vehicle. In some embodiments, the power distribution module can send a message to the microcontroller unit 612 to close and/or open one or more solid-state relays. In an example implementation, the message sent by the power distribution module can include an identifier of the switched channel and an instruction to either close or open the solid-state relay of the identified switched channel.

The front end of the unswitched and switched channels include fuses and EMI filters. For each unswitched and switched channel, one end of a fuse is electrically coupled to the output of the current relay 604 and the inrush limiter 606, and the other end of the fuse is electrically coupled to one end of the EMI filter. The EMI filter can have a passive filter circuit that can include an L-C filter circuit arranged in a D-Q network to minimize resonance frequency. The presence of the EMI filters in each channel is an advantageous technical feature at least because power sensitive electrical devices (e.g., Ethernet switch(es), or LiDAR sensor) can be electrically coupled to the PDUs. For each unswitched channel, the output of the EMI filter is electrically coupled to another VI sensors (e.g., 608a). For each unswitched channel, the output of the EMI filter is also electrically coupled to an electrical terminal to which one or more loads can be electrically connected. For each switched channel, the output of the EMI filter is electrically coupled to an input of a solid-state relay, where the output of the solid-state relay is electrically coupled to both another VI sensors (e.g., 608c) and an electrical terminal to which one or more loads can be electrically connected.

The another VI sensors in each switched and unswitched channel is communicably coupled to the microcontroller unit 612. The another VI sensors measure the voltage and current on the output of each switched or unswitched channel. The another VI sensors are communicably coupled to the microcontroller so that the another VI sensors provides current and voltage measurement values to the microcontroller. The microcontroller can determine whether a fault condition exists if the current and/or voltage measurement values are greater than a reference current threshold and/or a reference voltage threshold. If the microcontroller determines that either the measured current/voltage is greater than the reference current/voltage threshold, then the microcontroller can instruct the current relay 604 to open to disconnect the power bridge units and/or battery bridge units from the electrical device(s) electrically coupled to the PDU 600. The reference current threshold and/or a reference voltage threshold may be the same for the VI sensors 602 that measure value at the input terminal and the VI sensors 602 that measure values at either the output of the EMI filter (for the unswitched channels) or the output of the SSR (for the switched channels). In some embodiments, if the microcontroller determines that either the measured current/voltage is greater than the reference current/voltage threshold for a switched channel, then the microcontroller can instruct the solid-state relay to open for that channel instead of opening the current relay 604.

The PDU 600 includes a temperature sensor 610 that can be thermally coupled to a housing of the PDU 600. The temperature sensor 610 is communicably coupled to the microcontroller unit 612 so that the microcontroller unit 612 can determine whether a fault condition exists based on temperature values measured by the temperature sensor 610. When a microcontroller unit 612 determines that a fault condition (e.g., over-temperature) exists, the microcontroller unit 612 can send a command to the current relay 604 to open and disconnect the power bridge unit(s) and/or battery bridge units from the electrical load(s) electrically coupled to the PDU 600.

The microcontroller unit 612 can also compare the measured temperature provided by the temperature sensor 610 to a configurable reference high temperature (e.g., 75° F.) or to a range of reference temperatures (e.g., −20° F. to 75° F.). Thus, in some embodiments, if the microcontroller unit 612 in a PDU 600 determines that the measured temperature either exceeds the configurable reference high temperature or is greater than the highest temperature value in the range of reference temperatures, the microcontroller unit 612 can send a message indicating an over-temperature fault situation with the PDU's identification number (e.g., serial number) to the health module (735 in FIG. 7) in an onboard computer.

In some embodiments, each PDU's microcontroller unit can provide a health information to the health module in an onboard computer. The health information can indicate whether the currents, voltages, and temperature of a PDU is within a range of reference values or is less than a reference value. For example, the health information can be a message that includes an identifier of a PDU (e.g., serial number) and the measured currents and voltages by the VI sensors 602, 608a-608d and/or temperature value measured by the temperature sensor 610, or the health information can be a message that states that the PDU is operating at a "safe current level," "safe voltage level" and/or a "safe temperature level." In an example implementation, the microcontroller unit 612 may periodically send (e.g., every 5 seconds) health information of a PDU 600 to the health module in the onboard computer.

V. Second Exemplary Power Distribution System Embodiment

FIG. 3 shows a second exemplary power distribution system 300 that includes two alternative vehicle power sources 302a, 302b and eight or more battery bridge units 308a-308h. A first vehicle power source 302a is an alternator that generates and outputs 48-volts DC, and a second vehicle power source 302b is a shore charger that can alternatively generate and output 48-volts DC when connected to an electrical outlet when the vehicle is parked. The output of the first vehicle power source 302a is electrically coupled to an input of a first power bridge unit 304a, and the output of the second vehicle power source 302b is electrically coupled to an input of a second power bridge unit 304b.

Each of the two power bridge units 304a, 304b include voltage and/or current sensors, microcontroller, and a single pole switch or a solid-state relay. The technical features and operations of the various components of the power bridge unit 304a, 304b are the same as those described for the power bridge units 204a, 204b described in Section II. In some embodiments, the same components and the same electrical design can be used in the power bridge units in the three exemplary power distribution systems 200, 300, 400. In such embodiments, the various components of the power bridge units can be rated to operate at one or more voltages (e.g., 12-volt, 24-volts, 36-volts, 48-volts, and/or a higher voltage).

The outputs of the two power bridge units 304a, 304b are electrically coupled so that the two power bridge units 304a, 304b can be instructed by a power bridge module (725 in FIG. 7) to select between either the alternator or the shore charger to provide an output voltage to the power distribution units 306a-306c and OEM loads. Thus, the two power bridge units 304a, 304b alternatively and electrically couple the two vehicle power sources 302a, 302b to the first power distribution unit 306a, the battery bridge units 308a-308h, the second power distribution unit 306b, the third power distribution unit 306c and OEM loads.

The outputs of the two power bridge units 304a, 304b are electrically coupled to an input of the first power distribution unit 306a. When the single pole switch or solid-state relay in either of the two power bridge units 304a, 304b is closed, a first voltage (e.g., 48-volts) is sent to the first power distribution unit 306a. As an example, when the single pole switch or solid-state relay in the first power bridge unit 304a is closed while the single pole switch or solid-state relay in the second power bridge unit 304b is open, a first voltage (e.g., 48-volts) produced at the output of the alternator is sent to the first power distribution unit 306a. The first power distribution unit 306a can include various devices as further described in FIG. 6 to receive the first voltage from a vehicle power source and to output the first voltage to a set of devices electrically coupled to the output of the first power distribution unit 306a, where the set of devices operate at the first voltage.

The two power bridge units 304a, 304b alternatively and electrically couple the two vehicle power sources 302a, 302b to the battery bridge units 308a-308h. The battery bridge units 308a-308h are arranged in four banks connected in series with each bank having two or more battery bridge units electrically coupled in parallel. Each bank of batteries is connected in series to at least one other bank of batteries. In FIG. 3, the first bank of BBUs (308a, 308b) is immediately adjacent to and in series with a second bank of BBUs (308c, 308d), the second bank of BBUs (308c, 308d) is immediately adjacent to and in series with a third bank of BBUs (308e, 308f), and so on. The second exemplary power distribution system 300 as shown in FIG. 3 includes four banks of batteries where each of the first bank of batteries 308a-308b has a one end (shown as first electrical terminal 512a in FIG. 5A) that is electrically coupled to a first electrical bus 310a, where the first electrical bus 310a is also electrically coupled to the outputs of the two power bridge units 304a, 304b. Each of the first bank of batteries 308a-

308b also has another end (shown as second electrical terminal 512b in FIG. 5A) that is electrically coupled to a second electrical bus 310b. The second electrical bus 310b is also electrically coupled to the first electrical terminal of each of the second bank of batteries 308c-308d. A second electrical terminal of each of the second bank of batteries 308c-308d is electrically coupled to the third electrical bus 310c which is electrically coupled to the first electrical terminal of each of the third bank of batteries 308e-308f. A second electrical terminal of each of the third bank of batteries 308e-308f is electrically coupled to the fourth electrical bus 310d which is electrically coupled to the first electrical terminal of each of the fourth bank of batteries 308g-308h. And, the second electrical terminal of each of the fourth bank of batteries 308g-308h is electrically coupled to electrical ground.

In the first bank of batteries, two or more battery bridge units 308a-308b are electrically coupled in parallel by having a same first electrical terminal of each of the two or more battery bridge units 308a-308b electrically couple to the first electrical bus 310a and by having a same second electrical terminal of each of the two or more battery bridge units 308a-308b electrically couple to the second electrical bus 310b. In the second bank of batteries connected in series with the first bank of batteries, two or more battery bridge units 308c-308d are electrically coupled in parallel by having a same first electrical terminal of each of the two or more battery bridge units 308c-308d electrically couple to the second electrical bus 310b and by having a same second electrical terminal of each of the two or more battery bridge units 308c-308d electrically couple to the third electrical bus 310c. In the third bank of batteries connected in series with the first and second banks of batteries, two or more battery bridge units 308e-308f are electrically coupled in parallel by having a same first electrical terminal of each of the two or more battery bridge units 308e-308f electrically couple to the third electrical bus 310c and by having a same second electrical terminal of each of the two or more battery bridge units 308e-308f electrically couple to the fourth electrical bus 310d. In the fourth bank of batteries connected in series with the first, second, and third banks of batteries, two or more battery bridge units 308g-308h are electrically coupled in parallel by having a same first electrical terminal of each of the two or more battery bridge units 308g-308h electrically couple to the fourth electrical bus 310d and by having a same second electrical terminal of each of the two or more battery bridge units 308g-308h electrically couple to electrical ground.

Each of the eight or more battery bridge units 308a-308h can be identical and may include a battery manufactured to have a same charge capacity and a same nominal or reference voltage (e.g., 12-volts). Thus, the first bank of batteries in series with the second, third, and fourth bank of batteries produces or outputs a first voltage (e.g., 48-volts) at the first electrical bus 310a; the second bank of batteries in series with the third and fourth bank of batteries produces or outputs a second voltage (e.g., 36-volts) at the second electrical bus 310b; the third bank of batteries in series with the fourth bank of batteries produces or outputs a third voltage (e.g., 24-volts) at the third electrical bus 310c; and the fourth bank of batteries produces or outputs a fourth voltage (e.g., 12-volts) at the fourth electrical bus 310d.

The third electrical bus 310c, the first electrical terminals of the third bank of two or more batteries 308e-308f, and the second electrical terminals of the second bank of batteries 308c-308d is electrically coupled to a second power distribution unit 306b. The fourth electrical bus 310d, the first electrical terminals of the fourth bank of two or more batteries 308g-308h, and the second electrical terminals of the third bank of batteries 308e-308f is electrically coupled to a third power distribution unit 306c. The power distribution units 306a, 306b, 306c can have the same architecture and is further described in FIG. 6. In some embodiments, fourth electrical bus 310d, the first electrical terminals of the fourth bank of two or more batteries 308g-308h, and the second electrical terminals of the third bank of batteries 308e-308f is also electrically coupled to the vehicle's OEM devices (e.g., truck audio engine controller unit, starter, etc.). For at least the reasons explained in Section II, coupling of OEM loads, 12-volt loads, and 24-volt loads to one or more lower banks of the battery bridge units via the third electrical bus 310c and the fourth electrical bus 310d is an unconventional but advantageous technical feature.

VI. Third Exemplary Power Distribution System Embodiment

FIG. 4 shows a third exemplary power distribution system 400 that includes two alternative vehicle power sources 402a, 402b, one or more additional vehicle power sources 402c, 402d, and eight or more battery bridge units 408a-408h. The vehicle power source 402a and the one or more additional vehicle power sources 402c, 402d can be separate alternators that operate in the vehicle. Thus, the exemplary power distribution system 400 can include at least three vehicle power sources of which at least two alternators can provide power on the vehicle. For example, the exemplary power distribution system 400 can include the vehicle power source 402a (alternator that can output 48-volts), 402b (shore power device that can output 48-volts), and 402c (alternator that can output 24-volts); or the exemplary power distribution system 400 can include the vehicle power source 402a, 402b, and 402d (alternator that can output 12-volts); or the exemplary power distribution system 400 can include the vehicle power source 402a, 402b, 402c, and 402d.

A first vehicle power source 302a is a first alternator that generates and outputs 48-volts DC, and a second vehicle power source 302b is a shore charger that can alternatively generate and output 48-volts DC when connected to an electrical outlet when the vehicle is parked. A third vehicle power source 302c is a second alternator that generates and outputs 24-volts DC, and a fourth vehicle power source 302d is a third alternator that generates and outputs 12-volts DC. The output of the first vehicle power source 402a is electrically coupled to an input of a first power bridge unit 404a, and the output of the second vehicle power source 402b is electrically coupled to an input of a second power bridge unit 404b, the output of the first vehicle power source 402c is electrically coupled to an input of a third power bridge unit 404c, and the output of the fourth vehicle power source 402d is electrically coupled to an input of a fourth power bridge unit 404d.

Each of the four power bridge units 404a-404d include voltage and/or current sensors, microcontroller, and a single pole switch or a solid-state relay. The technical features and operations of the various components of the power bridge unit 404a-404d are the same as those described for the power bridge units 204a, 204b described in Section II.

The outputs of the two power bridge units 404a, 404b are electrically coupled so that the two power bridge units 404a, 404b can be instructed by a power bridge module (725 in FIG. 7) to select between either the alternator or the shore charger to provide an output voltage to the power distribution units 406a-406c and OEM loads. Thus, the two power bridge units 404a, 404b alternatively and electrically couple the two vehicle power sources 402a, 402b to the first power distribution unit 406a, the battery bridge units 408a-408h, the second power distribution unit 406b, the third power distribution unit 406c and OEM loads.

The outputs of the two power bridge units 404a, 404b are electrically coupled to an input of the first power distribution unit 406a. When the single pole switch or solid-state relay in either of the two power bridge units 404a, 404b is closed, a first voltage (e.g., 48-volts) is sent to the first power distribution unit 406a. As an example, when the single pole switch or solid-state relay in the first power bridge unit 404a is closed while the single pole switch or solid-state relay in the second power bridge unit 404b is open, a first voltage (e.g., 48-volts) produced at the output of the first alternator is sent to the first power distribution unit 406a. The first power distribution unit 406a can include various devices as further described in FIG. 6 to receive the first voltage from a vehicle power source and to output the first voltage to a set of devices electrically coupled to the output of the first power distribution unit 406a, where the set of devices operate at the first voltage.

The output of the third power bridge unit 404c is electrically coupled to the third electrical bus 410c, and the output of the fourth power bridge unit 404d is electrically coupled to the fourth electrical bus 410d. The two power bridge units 404c, 304d can be independently instructed by a power bridge module (725 in FIG. 7) to provide one or more output voltages to the power distribution units 406b, 406c and OEM loads. Thus, any one or both of the power bridge units 404c, 404c can respectively and electrically couple any one or both vehicle power sources 402c, 402d to the second power distribution unit 406b, the battery bridge units 408e-408h, the third power distribution unit 406c, and/or OEM loads.

The two power bridge units 404a, 404b alternatively and electrically couple the two vehicle power sources 402a, 402b to the battery bridge units 408a-408h. Furthermore, the power bridge units 404c, 404d can electrically couple the vehicle power sources 402c, 402c to the battery bridge units 408e-408h. The battery bridge units 408a-408h are arranged in four banks connected in series with each bank having two or more battery bridge units electrically coupled in parallel. Each bank of batteries is connected in series to at least one other bank of batteries. In FIG. 4, the first bank of BBUs (408a, 408b) is immediately adjacent to and in series with a second bank of BBUs (408c, 408d), the second bank of BBUs (408c, 408d) is immediately adjacent to and in series with a third bank of BBUs (408e, 408f), and so on. The second exemplary power distribution system 400 as shown in FIG. 4 includes four banks of batteries where each of the first bank of batteries 408a-408b has a one end (shown as first electrical terminal 512a in FIG. 5A) that is electrically coupled to a first electrical bus 410a, where the first electrical bus 410a is also electrically coupled to the outputs of the two power bridge units 404a, 404b. Each of the first bank of batteries 408a-408b also has another end (shown as second electrical terminal 512b in FIG. 5A) that is electrically coupled to a second electrical bus 410b. The second electrical bus 410b is also electrically coupled to the first electrical terminal of each of the second bank of batteries 408c-408d. A second electrical terminal of each of the second bank of batteries 408c-408d is electrically coupled to the third electrical bus 410c which is electrically coupled to the first electrical terminal of each of the third bank of batteries 408e-408f. A second electrical terminal of each of the third bank of batteries 408e-408f is electrically coupled to the fourth electrical bus 410d which is electrically coupled to the first electrical terminal of each of the fourth bank of batteries 408g-408h. And, the second electrical terminal of each of the fourth bank of batteries 408g-408h is electrically coupled to electrical ground.

In some embodiments, both power bridge units 404c, 404d can be respectively and electrically coupled to the third electrical bus 410c and the fourth electrical bus 410d. In some embodiments where either the 24-volt alternator or the 12-volt alternator are used, either the power bridge unit 404c is electrically coupled to the third electrical bus 410c or the power bridge unit 404d is electrically coupled to the fourth electrical bus 410d.

In the first bank of batteries, two or more battery bridge units 408a-408b are electrically coupled in parallel by having a same first electrical terminal of each of the two or more battery bridge units 408a-408b electrically couple to the first electrical bus 410a and by having a same second electrical terminal of each of the two or more battery bridge units 408a-408b electrically couple to the second electrical bus 410b. In the second bank of batteries connected in series with the first bank of batteries, two or more battery bridge units 408c-408d are electrically coupled in parallel by having a same first electrical terminal of each of the two or more battery bridge units 408c-408d electrically couple to the second electrical bus 410b and by having a same second electrical terminal of each of the two or more battery bridge units 408c-408d electrically couple to the third electrical bus 410c. In the third bank of batteries connected in series with the first and second banks of batteries, two or more battery bridge units 408e-408f are electrically coupled in parallel by having a same first electrical terminal of each of the two or more battery bridge units 408e-408f electrically couple to the third electrical bus 410c and by having a same second electrical terminal of each of the two or more battery bridge units 408e-408f electrically couple to the fourth electrical bus 410d. In the fourth bank of batteries connected in series with the first, second, and third banks of batteries, two or more battery bridge units 408g-408h are electrically coupled in parallel by having a same first electrical terminal of each of the two or more battery bridge units 408g-408h electrically couple to the fourth electrical bus 410d and by having a same second electrical terminal of each of the two or more battery bridge units 408g-408h electrically couple to electrical ground.

Each of the eight or more battery bridge units 408a-408h can be identical and may include a battery manufactured to have a same charge capacity and a same nominal or reference voltage (e.g., 12-volts). Thus, the first bank of batteries in series with the second, third, and fourth bank of batteries produces or outputs a first voltage (e.g., 48-volts) at the first electrical bus 410a; the second bank of batteries in series with the third and fourth bank of batteries produces or outputs a second voltage (e.g., 36-volts) at the second electrical bus 410b; the third bank of batteries in series with the fourth bank of batteries produces or outputs a third voltage (e.g., 24-volts) at the third electrical bus 410c; and the fourth bank of batteries produces or outputs a fourth voltage (e.g., 12-volts) at the fourth electrical bus 410d.

The third electrical bus 410c, the first electrical terminals of the third bank of two or more batteries 408e-408f, and the second electrical terminals of the second bank of batteries 408c-408d is electrically coupled to a second power distribution unit 406b. The fourth electrical bus 410d, the first electrical terminals of the fourth bank of two or more batteries 408g-408h, and the second electrical terminals of the third bank of batteries 408e-408f is electrically coupled to a third power distribution unit 406c. The power distribution units 406a, 406b, 406c can have the same architecture and is further described in FIG. 6. In some embodiments, fourth electrical bus 410d, the first electrical terminals of the fourth bank of two or more batteries 408g-408h, and the second electrical terminals of the third bank of batteries 408e-408f is also electrically coupled to the vehicle's OEM devices (e.g., truck audio engine controller unit, starter, etc.). For at least the reasons explained in Section II, coupling of OEM loads, 12-volt loads, and 24-volt loads to one or more lower banks of the battery bridge units via the third electrical bus 310c and fourth electrical bus 310d is an unconventional but advantageous technical feature.

The power distribution system architectures described in Section V and VI are further described below. Each of the second and the third exemplary power distributions system includes a first and second means for providing electrical power (e.g., a first and a second power devices) at a first voltage in the vehicle, and a first and second means for electrically coupling (e.g., a first and a second power bridge units) either the first means for providing electrical power or the second means for providing electrical power to a first power distribution unit (PDU). A same terminal of the first and second means for electrically coupling are electrically coupled to a first electrical bus that is electrically coupled to an input terminal of the first PDU. The first PDU is configured to provide electrical power to a first set of devices that operate at a first voltage in the vehicle.

Each of the second and the third exemplary power distributions system includes two or more banks of means for receiving electrical power from either the first or second means for providing electrical power and for providing electrical power at the first voltage to the first set of devices, a second voltage to a second set of devices in the vehicle, and a third voltage to a third set of devices in the vehicle. The two or more banks of means of receiving electrical power and providing electrical power can include two or more BBUs. Each means for receiving electrical power and for providing electrical power comprises: a first terminal electrically coupled to an anode of a battery, a cell balancer unit configured to discharge the battery upon determining that the battery is in an over-charged condition, where a first end of a cell balancer is electrically coupled to the first terminal, a second terminal electrically coupled to a cathode of the battery, and a third terminal electrically coupled to a second end of the cell balancer unit.

In the second and third exemplary power distribution systems, the means for receiving electrical power and for providing electrical power can be a battery bridge unit (BBU). Each of the second and the third exemplary power distributions system includes first terminals of two or more BBUs in a first bank of BBUs is electrically coupled to the first electrical bus, second terminals of the two or more BBUs in the first bank of BBUs are electrically coupled to a second electrical bus, first terminals of two or more BBUs in a second bank of BBUs is electrically coupled to the second electrical bus, second terminals of the two or more BBUs in the second bank of BBUs is electrically coupled to a third electrical bus, first terminals of two or more BBUs in a third bank of BBUs is electrically coupled to the third electrical bus, second terminals of the two or more BBUs in the third bank of BBUs is electrically coupled to a fourth electrical bus, first terminals of two or more BBUs in a fourth bank of BBUs is electrically coupled to the fourth electrical bus, second terminals of the two or more BBUs in the fourth bank of BBUs is electrically coupled to electrical ground, and third terminals of the two or more BBUs in the first bank of BBUs, in the second banks of BBUs, in the third bank of BBUs and in the fourth bank of BBUs is electrically coupled to the first electrical bus.

Each of the second and the third exemplary power distributions system includes a second PDU electrically coupled to the third electrical bus, where the second PDU is configured to provide electrical power to the second set of devices that operate at the second voltage in the vehicle. Each of the second and the third exemplary power distributions system includes a third PDU electrically coupled to the fourth electrical bus, where the third PDU is configured to provide electrical power to the third set of devices that operate at the third voltage in the vehicle.

Figure 7:
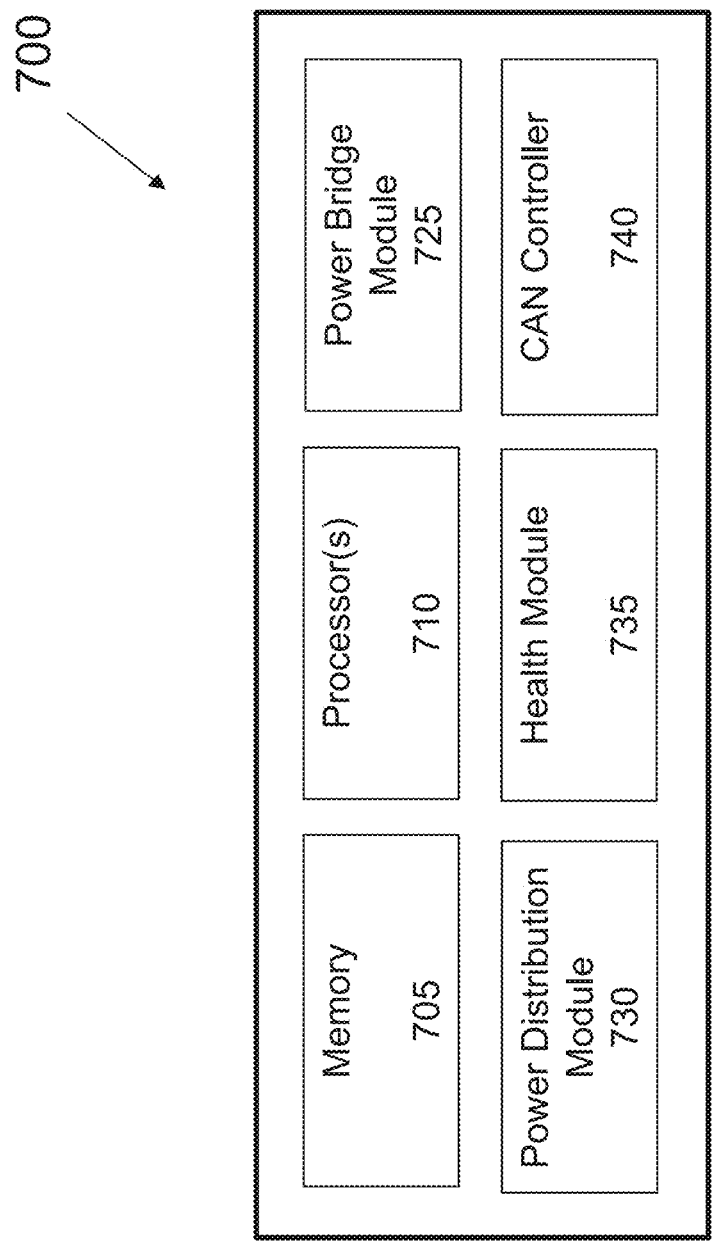
FIG. 7 shows an exemplary block diagram of a computer or server included in a vehicle.

FIG. 7 shows an exemplary block diagram of a computer or server 700 included in a vehicle. The computer 700 includes at least one processor 710 and a memory 705 having instructions stored thereupon. The instructions upon execution by the processor 710 configure the computer 700 to perform the operations described for the various modules as described in FIGS. 1 to 6, and/or the operations described for the modules in the various embodiments or sections in this patent document.

Figure 9:
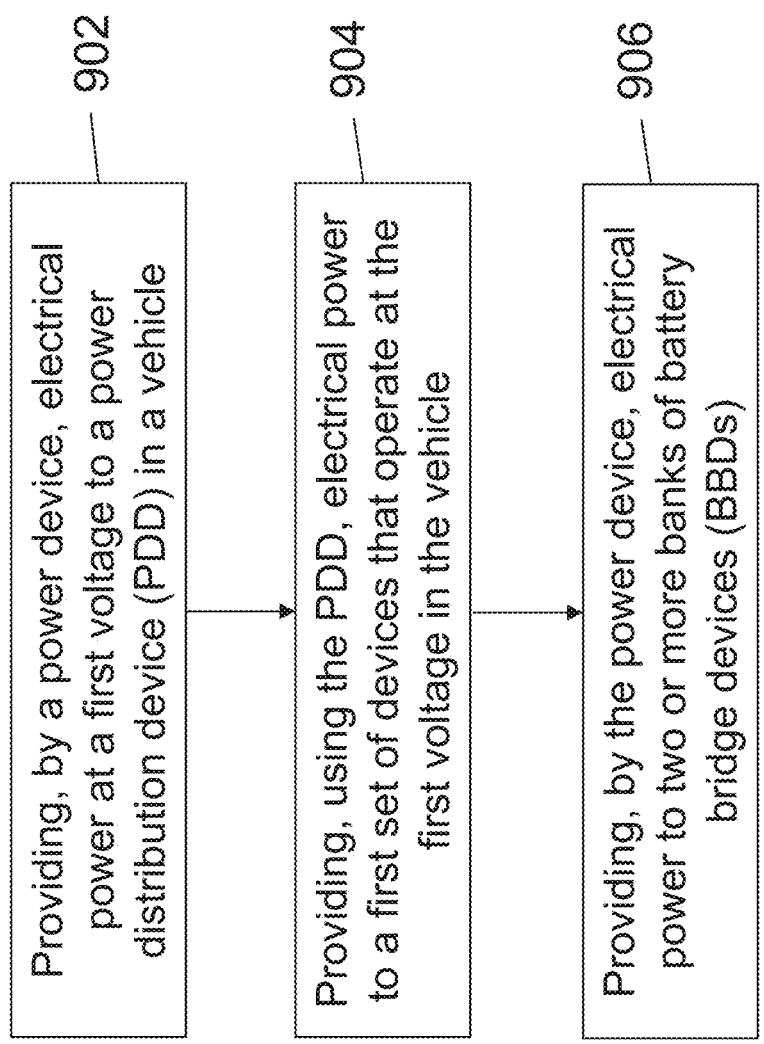
FIG. 9 shows an example flowchart for providing power in a vehicle.

FIG. 9 shows an example flowchart for providing power in a vehicle. Operation 902 includes providing, by a power device, electrical power at a first voltage to a power distribution device (PDD) in a vehicle. Operation 904 includes providing, using the PDD, electrical power to a first set of devices that operate at the first voltage in the vehicle. Operation 906 includes providing, by the power device, electrical power to two or more banks of battery bridge devices (BBDs), where the two or more banks of BBDs provide electrical power at the first voltage to the first set of devices via the PDD, where one or more banks of BBDs provide electrical power at a second voltage to a second set of devices in the vehicle, and where one bank of BBDs is electrically coupled in series to another bank of BBDs.

In some embodiments, each BBD comprises a battery, and where the method of FIG. 9 further comprises: discharging, by each BBD, the battery upon determining that the battery is in an over-charged condition. In some embodiments, the method of FIG. 9 further comprises disconnecting, for each BBD, the battery from a source of electrical power upon determining that a measured amount of current drawn from the battery is greater than a first threshold value or that a measured temperature of a BBD is greater than a second threshold value. In some embodiments, the method of FIG. 9 further comprises sending a message to a computer located in the vehicle, where the message includes the measured amount of current or the measured temperature, and where the message includes an identifier of a BBD that sent the message.

In some embodiments of the method of FIG. 9, for each BBD, the battery is determined to be in the over-charged condition by: generating an output voltage upon determining that a voltage across the battery is greater than a highest value of one or more reference voltages; and discharging the battery in response to the generating the output voltage. In some embodiments, the method of FIG. 9 further comprises generating, by each BBD, another voltage upon determining that the voltage across the battery is less than a lowest value of the one or more reference voltages; and charging the battery in response to the generating the another voltage. In some embodiments, the method of FIG. 9 further comprises disconnecting the PDD from the power device and the two or more banks of BBDs upon determining that a temperature value measured by a temperature sensor on or in the PDD exceeds a threshold value; or disconnecting the PDD from the power device and the two or more bank of BBDs upon determining that a voltage measured by a voltage sensor in the PDD exceeds a first threshold value or that a current measured by a current sensor in the PDD exceeds a second threshold value.

Another example embodiment discloses a power distribution system that comprises a first power device and a second power device located on or in a vehicle, where either the first power device or the second power device is configured to provide electrical power at a first voltage to a first power distribution device (PDD) in the vehicle, where the first PDD is configured to provide electrical power to a first set of devices that operate at the first voltage in the vehicle; and two or more banks of battery bridge devices (BBDs) configured to receive electrical power from either the first power device or the second power device, where the two or more banks of BBDs are configured to provide electrical power at the first voltage to the first set of devices via the first PDD, where one or more banks of BBDs are configured to provide electrical power at a second voltage to a second set of devices in the vehicle, and where one bank of BBDs is electrically coupled in series to another bank of BBDs.

In some embodiments, each BBD comprises a battery and a cell balancer configured to discharge the battery upon determining that the battery is in an over-charged condition. In some embodiments, each BBD further comprises: an electrical switch electrically coupled to an anode of the battery, a microcontroller, a current sensor that measures an amount of current drawn from the battery, and a temperature sensor that measures a temperature of the battery, where the microcontroller is communicably coupled to the electrical switch, the temperature sensor, and the current sensor, and where the microcontroller is configured to instruct the electrical switch to open in response to determining that a measured amount of current drawn from the battery is greater than a first threshold value or that a measured temperature is greater than a second threshold value.

In some embodiments, in each BBD, the cell balancer includes a direct current-direct current (DC-DC) converter that is electrically coupled to a comparator, where, in each BBD, the microcontroller is communicably coupled to one or more inputs of the comparator and a second input of the comparator is electrically coupled to an anode of the battery, where the microcontroller is configured to send to the one or more inputs of the comparator one or more reference voltages, where the comparator is configured to generate an output voltage upon determining that a voltage across the battery is greater than a highest value of the one or more reference voltages, and where the DC-DC converter is configured to turn on the DC-DC converter to discharge the battery upon sensing the output voltage. In some embodiments, the power distribution system further comprises a second PDD electrically coupled to an electrical bus in between two adjacent banks of BBDs, wherein the one or more banks of BBDs are configured to provide electrical power at the second voltage to the second set of devices in the vehicle via the second PDD.

In some embodiments, each of the first PDD and the second PDD comprises: a first relay; a temperature sensor communicably coupled to a microcontroller, where the microcontroller is configured to instruct the first relay to open to disconnect a PDD from the first power device, the second power device, and the two or more banks of BBDs upon determining that a temperature value measured by the temperature sensor exceeds a threshold value. In some embodiments, each of the first PDD and the second PDD comprises: a first voltage sensor and a first current sensor electrically coupled to a terminal in a PDD and communicably coupled to the microcontroller, and where the microcontroller is configured to instruct the first relay to open to disconnect the PDD from either the first power device and the second power device or the two or more bank of BBDs upon determining that a voltage measured by the first voltage sensor exceeds a first threshold value or that a current measured by the first current sensor exceeds a second threshold value.

In some embodiments, each of the first PDD and the second PDD comprises a first set of channels and a second set of channels, where each channel of the first set of channels comprises: a first electromagnetic interference (EMI) filter electrically coupled to at least some of either the first set of devices or the second set of devices; and where each of the second set of channels comprises: a second EMI filter, a second relay electrically coupled to the second EMI filter and to at least some of either the first set of devices or the second set of devices, and the microcontroller communicably coupled to the second relay, wherein the microcontroller is configured to instruct the second relay to switch on to power at least some of either the first set of devices or the second set of devices. In some embodiments, each of the first set of channels and the second set of channels comprises: a second voltage sensor and a second current sensor electrically coupled to the first EMI filter or the second EMI filter and electrically coupled to the first relay or the second relay, where the second voltage sensor and the second current sensor are communicably coupled to the microcontroller, and where the microcontroller is configured to instruct the first relay or the second relay to open upon determining that a voltage measured by the second voltage sensor exceeds the first threshold value or that a current measured by the second current sensor exceeds the second threshold value.

In some embodiments, the vehicle comprises a third set of devices that are configured to operate on or in the vehicle at the second voltage, wherein the third set of devices are electrically coupled to the electrical bus in between two adjacent banks of BBDs, and where the third set of devices are not electrically coupled to the electrical bus via the second PDD. In some embodiments, the first power device and the second power device are respectively configured to provide electrical power via a first power bridge device and a second power bridge device to the first PDD, and where each of the first power bridge device and the second power bridge device includes: an electrical switch or a relay, a current sensor that measures an amount of current flowing through the electrical switch or the relay or a voltage sensor that measure voltage of a terminal, and a microcontroller is communicably coupled to the electrical switch or the relay and to the current sensor or the voltage sensor, where the microcontroller is configured to instruct the electrical switch or the relay to open in response to determining that the measured current is greater than a first threshold value or that the measured voltage is greater than a second threshold value. In some embodiments, the first power device includes an alternator that is configured to generate electrical power at the first voltage. In some embodiments, the second power device includes a shore power device that is configured to receive electrical power from an electrical connector when the vehicle is parked and to convert the received electrical power to the first voltage.

In some embodiments, the microcontroller of a BBD is configured to send a message to a computer located in the vehicle, the message includes the measured amount of current or the measured temperature, and the message includes an identifier of a BBD whose microcontroller sent the message. In some embodiments, the comparator of a BBD is configured to generate another voltage upon determining that the voltage across the battery is less than a lowest value of the one or more reference voltages, and wherein the DC-DC converter turns off the DC-DC converter to charge the battery upon sensing the another voltage.

In some embodiments, the microcontroller of a PDD is configured to send a message to a computer located in the vehicle, wherein the message includes the voltage measured by the first voltage sensor or the second voltage sensor, or the message includes the current measured by the first current sensor or the second current sensor, and wherein the message includes an identifier of the PDD whose microcontroller sent the message. In some embodiments, the two or more banks of BBDs are further configured to provide electrical power at a third voltage to a fourth set of devices in the vehicle In some embodiments, a third PDD is electrically coupled to another electrical bus in between two adjacent banks of BBDs, wherein the third PDD is configured to provide electrical power to the fourth set of devices that operate at the third voltage in the vehicle.

In some embodiments, two or more alternators are electrically coupled to the two or more banks of BBDs, wherein each alternator is electrically coupled to a different electrical bus in between two adjacent banks of BBDs, and wherein each alternator is configured to provide electrical power at a different voltage. In some embodiments, the two or more alternators are configured to provide electrical power via two or more power bridge devices to the two or more banks of BBDs, and wherein each of the power bridge devices includes: an electrical switch or a relay, a current sensor that measures an amount of current flowing through the electrical switch or the relay or a voltage sensor that measure voltage of a terminal, and a microcontroller is communicably coupled to the electrical switch or the relay and to the current sensor or the voltage sensor, wherein the microcontroller is configured to instruct the electrical switch or the relay to open in response to determining that the measured current is greater than a first threshold value or that the measured voltage is greater than a second threshold value.

In this document the term "exemplary" is used to mean "an example of" and, unless otherwise stated, does not imply an ideal or a preferred embodiment. In this patent document, the microcontroller or microcontroller unit can be implemented as a configurable programmable logic device (CPLD) or an Application Specific Integrated Circuit (ASIC), or a Field Programmable Gate Array (FPGA) device.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:
1. A power distribution system, comprising:
one or more power devices located on or in a vehicle,
wherein the one or more power devices are configured to provide electrical power at a first voltage to a first set of devices in the vehicle; and
two or more banks of battery bridge devices (BBDs) configured to receive electrical power from the one or more power devices,
wherein the two or more banks of BBDs are configured to provide electrical power at the first voltage to the first set of devices,
wherein one or more banks of BBDs are configured to provide electrical power at a second voltage to a second set of devices in the vehicle, and wherein one bank of BBDs is electrically coupled in series to another bank of BBDs.

2. The power distribution system of claim 1, wherein each BBD comprises a battery and a cell balancer configured to discharge the battery upon determining that the battery is in an over-charged condition.

3. The power distribution system of claim 2,
wherein each BBD further comprises:
an electrical switch electrically coupled to an anode of the battery,
a microcontroller,
a current sensor that measures an amount of current drawn from the battery, and
a temperature sensor that measures a temperature of the battery,
wherein the microcontroller is communicably coupled to the electrical switch, the temperature sensor, and the current sensor, and
wherein the microcontroller is configured to instruct the electrical switch to open in response to determining that a measured amount of current drawn from the battery is greater than a first threshold value or that a measured temperature is greater than a second threshold value.

4. The power distribution system of claim 3,
wherein, in each BBD, the cell balancer includes a direct current-direct current (DC-DC) converter that is electrically coupled to a comparator,
wherein, in each BBD, the microcontroller is communicably coupled to one or more inputs of the comparator and a second input of the comparator is electrically coupled to the anode of the battery,
wherein the microcontroller is configured to send to the one or more inputs of the comparator one or more reference voltages,
wherein the comparator is configured to generate an output voltage upon determining that a voltage across the battery is greater than a highest value of the one or more reference voltages, and
wherein the DC-DC converter is configured to turn on the DC-DC converter to discharge the battery upon sensing the output voltage.

5. The power distribution system of claim 1, wherein the one or more power devices are configured to provide electrical power at the first voltage to a first power distribution device (PDD), the first PDD is configured to provide electrical power to the first set of devices, and the system further comprising:
a second PDD electrically coupled to an electrical bus in between two adjacent banks of BBDs, wherein the one or more banks of BBDs are configured to provide electrical power at the second voltage to the second set of devices in the vehicle via the second PDD.

6. The power distribution system of claim 5, wherein each of the first PDD and the second PDD comprises:
a first relay;
a temperature sensor communicably coupled to a microcontroller,
wherein the microcontroller is configured to instruct the first relay to open to disconnect a PDD from a first power device, a second power device, and the two or more banks of BBDs upon determining that a temperature value measured by the temperature sensor exceeds a threshold value.

7. The power distribution system of claim 6, wherein each of the first PDD and the second PDD comprises:
a first voltage sensor and a first current sensor electrically coupled to a terminal in a PDD and communicably coupled to the microcontroller, and
wherein the microcontroller is configured to instruct the first relay to open to disconnect the PDD from either the first power device and the second power device or the two or more bank of BBDs upon determining that a voltage measured by the first voltage sensor exceeds a first threshold value or that a current measured by the first current sensor exceeds a second threshold value.

8. The power distribution system of claim 6,
wherein each of the first PDD and the second PDD comprises a first set of channels and a second set of channels,
wherein each channel of the first set of channels comprises:
a first electromagnetic interference (EMI) filter electrically coupled to at least some of either the first set of devices or the second set of devices; and
wherein each of the second set of channels comprises:
a second EMI filter,
a second relay electrically coupled to the second EMI filter and to at least some of either the first set of devices or the second set of devices, and
the microcontroller communicably coupled to the second relay, wherein the microcontroller is configured to instruct the second relay to switch on to power at least some of either the first set of devices or the second set of devices.

9. The power distribution system of claim 8, wherein each of the first set of channels and the second set of channels comprises:
a second voltage sensor and a second current sensor electrically coupled to the first EMI filter or the second EMI filter and electrically coupled to the first relay or the second relay,
wherein the second voltage sensor and the second current sensor are communicably coupled to the microcontroller, and
wherein the microcontroller is configured to instruct the first relay or the second relay to open upon determining that a voltage measured by the second voltage sensor exceeds the first threshold value or that a current measured by the second current sensor exceeds the second threshold value.

10. The power distribution system of claim 5,
wherein the vehicle comprises a third set of devices that are configured to operate on or in the vehicle at the second voltage,
wherein the third set of devices are electrically coupled to the electrical bus in between two adjacent banks of BBDs, and
wherein the third set of devices are not electrically coupled to the electrical bus via the second PDD.

11. The power distribution system of claim 1,
wherein the one or more power devices comprises a first power device and a second power device, the first power device and the second power device are respectively configured to provide electrical power via a first power bridge device and a second power bridge device to the first set of devices, and
wherein each of the first power bridge device and the second power bridge device includes:
an electrical switch or a relay, a current sensor that measures an amount of current flowing through the electrical switch or the relay or a voltage sensor that measure voltage of a terminal, and a microcontroller is communicably coupled to the electrical switch or the relay and to the current sensor or the voltage sensor, wherein the microcontroller is configured to instruct the electrical switch or the relay to open in response to determining that the measured current is greater than a first threshold value or that the measured voltage is greater than a second threshold value.

12. The power distribution system of claim 1, wherein the one or more power devices comprises an alternator that is configured to generate electrical power at the first voltage.

13. The power distribution system of claim 1, wherein the one or more power devices comprises a shore power device that is configured to receive electrical power from an electrical connector when the vehicle is parked and to convert the received electrical power to the first voltage.

14. A method of providing power, comprising:
providing, by a power device, electrical power at a first voltage to a first set of devices in a vehicle; and
providing, by the power device, electrical power to two or more banks of battery bridge devices (BBDs),
wherein the two or more banks of BBDs provide electrical power at the first voltage to the first set of devices in the vehicle,
wherein one or more banks of BBDs provide electrical power at a second voltage to a second set of devices in the vehicle, and
wherein one bank of BBDs is electrically coupled in series to another bank of BBDs.

15. The method of claim 14,
wherein each BBD comprises a battery, and
wherein the method further comprises:
discharging, by each BBD, the battery upon determining that the battery is in an over-charged condition.

16. The method of claim 15, further comprising:
disconnecting, for each BBD, the battery from a source of electrical power upon determining that a measured amount of current drawn from the battery is greater than a first threshold value or that a measured temperature of a BBD is greater than a second threshold value.

17. The method of claim 16, further comprising:
sending a message to a computer located in the vehicle,
wherein the message includes the measured amount of current or the measured temperature, and
wherein the message includes an identifier of a BBD that sent the message.

18. The method of claim 15, wherein, for each BBD, the battery is determined to be in the over-charged condition by:
generating an output voltage upon determining that a voltage across the battery is greater than a highest value of one or more reference voltages; and
discharging the battery in response to the generating the output voltage.

19. The method of claim 18, further comprising:
generating, by each BBD, another voltage upon determining that the voltage across the battery is less than a lowest value of the one or more reference voltages; and
charging the battery in response to the generating the another voltage.

20. The method of claim 14, wherein providing, by the power device, electrical power at the first voltage to the first set of devices comprises:
providing, by the power device, electrical power at the first voltage to a power distribution device (PDD) in the vehicle; and
providing, using the PDD, electrical power at the first voltage to the first set of devices;
the method further comprising:
disconnecting the PDD from the power device and the two or more banks of BBDs upon determining that a temperature value measured by a temperature sensor on or in the PDD exceeds a threshold value; or
disconnecting the PDD from the power device and the two or more bank of BBDs upon determining that a voltage measured by a voltage sensor in the PDD exceeds a first threshold value or that a current measured by a current sensor in the PDD exceeds a second threshold value.

\* \* \* \* \*